US012576404B2

(12) United States Patent
Wang et al.

(10) Patent No.: US 12,576,404 B2
(45) Date of Patent: Mar. 17, 2026

(54) DISPOSABLE REAGENT SCAFFOLD FOR BIOCHEMICAL PROCESS INTEGRATION

(71) Applicant: The Johns Hopkins University, Baltimore, MD (US)

(72) Inventors: Tza-Huei Wang, Germantown, MD (US); Dong Jin Shin, Baltimore, MD (US); Alexander Y. Trick, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 1346 days.

(21) Appl. No.: 17/051,717

(22) PCT Filed: Apr. 30, 2019

(86) PCT No.: PCT/US2019/029937
§ 371 (c)(1),
(2) Date: Oct. 29, 2020

(87) PCT Pub. No.: WO2019/213096
PCT Pub. Date: Nov. 7, 2019

(65) Prior Publication Data
US 2021/0114036 A1 Apr. 22, 2021

Related U.S. Application Data

(60) Provisional application No. 62/664,699, filed on Apr. 30, 2018.

(51) Int. Cl.
*B01L 7/00* (2006.01)
*G01N 35/00* (2006.01)

(52) U.S. Cl.
CPC ............... *B01L 7/00* (2013.01); *G01N 35/00* (2013.01); *B01L 2200/0647* (2013.01);
(Continued)

(58) Field of Classification Search
CPC ............... B01L 7/00; B01L 2200/0647; B01L 2300/0816; B01L 2300/0829;
(Continued)

(56) References Cited

U.S. PATENT DOCUMENTS 6,485,690 B1 * 11/2002 Pfost ..................... B01L 3/5025
422/68.1
7,754,148 B2 * 7/2010 Yu ........................... B01L 3/527
422/537
(Continued)

OTHER PUBLICATIONS

Shin et al., Magnetic droplet manipulation platforms for nucleic acid detection at the point of care (Annals of Biomedical Engineering), Nov. 2014.
(Continued)

*Primary Examiner* — Jill A Warden
*Assistant Examiner* — Jacqueline Brazin
(74) *Attorney, Agent, or Firm* — Venable LLP; Ryan T. Ward

(57) ABSTRACT

Devices for assaying a biomolecule from a sample, including: a cartridge assembly structured to accept and secure a magnetofluidic cartridge to be used for the assaying, and a magnetic particle manipulation assembly arranged proximate the cartridge assembly, the magnetic particle manipulation assembly having a pair of magnets arranged to be on opposing sides of said magnetofluidic cartridge and which are substantially aligned along a line that will be transverse to the magnetofluidic cartridge such that the line can be aligned with a well in the magnetofluidic cartridge, and methods of using and assembling such devices.

24 Claims, 20 Drawing Sheets

Specification includes a Sequence Listing.

(52) U.S. Cl.
CPC ................. *B01L 2300/0816* (2013.01); *B01L 2300/0829* (2013.01); *B01L 2400/043* (2013.01); *G01N 2035/00346* (2013.01)

(58) Field of Classification Search
CPC ......... B01L 2400/043; B01L 2200/147; B01L 3/502761; B01L 2200/025; B01L 2200/12; B01L 2300/18; B01L 3/50851; G01N 35/00; G01N 2035/00346; G01N 2035/00366; G01N 35/0098; C12Q 1/6844
USPC ...................................................... 435/287.2
See application file for complete search history.

(56) References Cited

U.S. PATENT DOCUMENTS

| | | | | |
|---|---|---|---|---|
| 8,440,150 B2 * | 5/2013 | Den Dulk | ............. | B01F 33/451 422/537 |
| 2004/0037739 A1 * | 2/2004 | McNeely | .............. | B01L 3/5085 422/417 |
| 2005/0250220 A1 | 11/2005 | Kozulic et al. | | |
| 2008/0213853 A1 | 9/2008 | Garcia et al. | | |
| 2013/0017538 A1 * | 1/2013 | Ionescu-Zanetti | ...... | B03C 1/288 435/6.12 |
| 2015/0118740 A1 * | 4/2015 | Wang | ................ | B01L 3/502761 156/182 |
| 2015/0276777 A1 * | 10/2015 | Riether | .................. | G01N 35/10 700/230 |
| 2019/0056415 A1 * | 2/2019 | Lai | ..................... | C12N 15/1013 |

OTHER PUBLICATIONS

Stark et al., A sample-to-answer droplet magnetofluidic assay platform for quantitative methylation-specific PCR (Biomedical Microdevices) Mar. 28, 2018.

Al-Soud et al., Purification and characterization of PCR-inhibitory components in blood cells, J. Clin. Microbiol., (2001), 39 (2), pp. 485-493.

Berry et al., One-step purification of nucleic acid for gene expression analysis via Immiscible Filtration Assisted by Surface Tension (IFAST), Lab Chip, (2011), 11 (10), pp. 1747-1753.

Bhamla et al., Hand-powered ultralow-cost paper centrifuge, Nat. Biomed. Eng., (2017), 1, 9.

Chiou et al., Topography-assisted electromagnetic platform for blood-to-PCR in a droplet, Biosens. Bioelectron., (2013), 50, pp. 91-99.

Daw et al., The role of hepatitis C virus genotyping in evaluating the efficacy of INF-based therapy used in treating hepatitis C infected patients in Libya, Virol. Discov., (2013), 1, 3.

Edlin et al., Toward a more accurate estimate of the prevalence of hepatitis C in the United States, Hepatology, (2015), 62 (5), pp. 1353-1363.

Estes et al., Optimization of multiplexed PCR on an integrated microfluidic forensic platform for rapid DNA analysis, Analyst, (2012), 137 (23), pp. 5510-5519.

Falade-Nwulia et al., Public health clinic-based hepatitis C testing and linkage to care in Baltimore, J. Viral Hepat., (2016), 23 (5), pp. 366-374.

Gachon et al., Real-time PCR: what relevance to plant studies?, J. Exp. Bot., (2004), 55 (402), pp. 1445-1454.

Galbraith et al., Unrecognized chronic hepatitis C virus infection among baby boomers in the emergency department, Hepatology, (2015), 61 (3), pp. 776-782.

Ghany et al., Diagnosis, management, and treatment of hepatitis C: An update, Hepatology, (2009), 49 (4), pp. 1335-1374.

Gourlain et al., Dynamic Range of Hepatitis C Virus RNA Quantification with the Cobas Ampliprep-Cobas Amplicor HCV Monitor v2.0 Assay, J. Clin. Microbiol., (2005), 43 (4), pp. 1669-1673.

Hagan et al., Self-reported hepatitis C virus antibody status and risk behavior in young injectors, Public Health Rep, (2006), 121 (6), pp. 710-719.

Hamond et al., Urinary PCR as an increasingly useful tool for an accurate diagnosis of leptospirosis in livestock, Vet. Res. Commun., (2014), 38 (1), pp. 81-85.

Institute of Medicine (US) Committee on the Prevention and Control of Viral Hepatitis Infection, Hepatitis and Liver Cancer: A National Strategy for Prevention and Control of Hepatitis B and C, National Academies Press (US), (2010).

Jiang et al., A miniaturized, parallel, serially diluted immunoassay for analyzing multiple antigens, J. Am. Chem. Soc., (2003), 125 (18), pp. 5294-5295.

Johannessen, Where we are with point-of-care testing, Journal of Viral Hepatitis, (2015), 22 (4), pp. 362-365.

Kim et al., A disposable, self-contained PCR chip, Lab Chip, (2009), 9 (4), pp. 606-612.

Kodzius et al., Inhibitory effect of common microfluidic materials on PCR outcome, Sensors Actuators B: Chem, (2012), 161 (1), pp. 349-358.

Lehmann et al., Droplet-based DNA purification in a magnetic lab-on-a-chip, Angew Chem Int Ed Engl, (2006), 45 (19), pp. 3062-3067.

Linas et al., The hepatitis C cascade of care: Identifying priorities to improve clinical outcomes, PLoS One, (2014), 9 (5), e97317.

Liu et al., A high-efficiency superhydrophobic plasma separator, Lab Chip, (2016), 16 (3), pp. 553-560.

Mirmajlessi et al., PCR-based specific techniques used for detecting the most important pathogens on strawberry: a systematic review, Syst. Rev., (2015), 4 (1), 9.

National Institutes of Health Consensus Development Conference Statement: Management of hepatitis C 2002 (Jun. 10-12, 2002), Gastroenterology, (2002), 123 (6), pp. 2082-2099.

Pawlotsky et al., Standardization of Hepatitis C Virus RNA Quantification, Hepatology, (2000), 32 (3), pp. 654-659.

Pipper et al., Catching bird flu in a droplet, Nat. Med., (2017), 13 (10), pp. 1259-1263.

Pisanic et al., DREAMing: A simple and ultrasensitive method for assessing intratumor epigenetic heterogeneity directly from liquid biopsies, Nucleic Acids Res, (2015), 43 (22), e154.

Rein et al., The cost-effectiveness of birth-cohort screening for hepatitis C antibody in U.S. primary care settings, Ann. Intern. Med., (2012), 156 (4), pp. 263-270.

Scott et al., Molecular diagnostics of hepatitis C virus infection: a systematic review, JAMA, (2007), 297 (7), pp. 724-732.

Shin et al., Mobile nucleic acid amplification testing (mobiNAAT) for Chlamydia trachomatis screening in hospital emergency department settings, Sci. Rep., (2017), 7 (1), 4495.

Song et al., A Multifunctional Reactor with Dry-Stored Reagents for Enzymatic Amplification of Nucleic Acids, Anal. Chem., (2018), 90 (2), pp. 1209-1216.

Stark et al., A parallelized microfluidic DNA bisulfite conversion module for streamlined methylation analysis, Biomed. Microdevices, (2016), 18 (1), 5.

Ticehurst et al., Factors Affecting Serum Concentrations of Hepatitis C Virus (HCV) RNA in HCV Genotype 1-Infected Patients with Chronic Hepatitis, J. Clin. Microbiol., (2007), 45 (8), pp. 2426-2433.

Tichopad et al., Standardized determination of real-time PCR efficiency from a single reaction set-up, Nucleic Acids Res, (2003), 31 (20), e122.

Tone et al., Enhancing melting curve analysis for the discrimination of loop-mediated isothermal amplification products from four pathogenic molds: Use of inorganic pyrophosphatase and its effect in reducing the variance in melting temperature values, J. Microbiol. Methods, (2017), 132, pp. 41-45.

Unger et al., Monolithic microfabricated valves and pumps by multilayer soft lithography, Science, (2000), 288 (5463), pp. 113-116.

Zein, Clinical significance of hepatitis C virus genotypes, Clin. Microbiol. Rev., (2000), 13 (2), pp. 223-235.

(56) References Cited

OTHER PUBLICATIONS

Zhang et al., A surface topography assisted droplet manipulation platform for biomarker detection and pathogen identification, Lab Chip, (2011), 11 (3), pp. 398-406.

Zhang et al., Full-range magnetic manipulation of droplets via surface energy traps enables complex bioassays, Adv. Mater., (2013), 25 (21), pp. 2903-2908.

Zhang et al., Magnetic digital microfluidics—a review, Lab Chip, (2017), 17 (6), pp. 994-1008.

* cited by examiner 0.75 mm PMMA (Lasercut)
0.25 mm PTFE (Lasercut)
2 mm PMMA + PSA (Lasercut)
0.2 mm PMMA (Thermoformed)
6mm
40mm Binding Buffer
Wash Buffer
PCR Buffer
pH=5
pH=7
pH=8.5
Thermal Cycling Melt
Temperature
Fluorescence
(+)HCV RNA
Time
(-)HCV RNA (i)          (ii)          (iii)

Lysis/Extraction

Wash

PCR

Swab Elute   Magnetic beads   Assay Cartridge 5.4"   3.3"

5"

DISPOSABLE REAGENT SCAFFOLD FOR BIOCHEMICAL PROCESS INTEGRATION

CROSS-REFERENCE OF RELATED APPLICATION

This application is a National Stage Application of International Application No. PCT/US2019/029937, filed Apr. 30, 2019, which claims priority to U.S. Provisional Application No. 62/664,699 filed Apr. 30, 2018; the entire contents of all of which are hereby incorporated by reference.

This invention was made with government support under Grant No. R01AI117032 awarded by the Department of Health and Human Services and the National Institutes of Health (NIH). The government has certain rights in this invention.

SEQUENCE LISTING

The instant application contains a Sequence Listing which has been submitted electronically in ASCII format and is hereby incorporated by reference in its entirety. Said ASCII copy, created on May 15, 2025, is named 02240_529076_SL.txt and is 1,253 bytes in size.

BACKGROUND

1. Technical Field

The field of the currently claimed embodiments of this invention relates to methods and devices for biochemical assays, and more particularly to methods and devices for magnetic particle-driven biochemical assays.

2. Discussion of Related Art

Chronic hepatitis C (HCV) infection is a major public health problem which affects approximately 3.5 million people in the United States.[1] Early stages of HCV are often asymptomatic, so most persons living with an infection are unaware of their infected status, and consequently do not receive the timely care and treatment needed to prevent severe HCV-associated complications including cirrhosis and hepatocellular carcinoma (HCC).[2] For the majority of population outside the baby boomer cohort, current U.S. guidelines recommend limiting HCV screening to high-risk individuals, a strategy which neglects up to 49-75% of infected individuals who are unaware of their infection.[2,3] Such an approach will result in approximately 1.76 million individuals in the US developing cirrhosis and 400,000 individuals developing HCC in the next 40-50 years.[4]

Missed opportunities in the HCV care pathway point to technical bottlenecks. The Centers for Disease Control and Prevention (CDC) recommends a diagnostic algorithm for HCV that first screens patients with a point-of-care antibody test, which requires a second, RNA-based confirmatory test once a positive result is obtained. A recent assessment of hepatitis C treatment cascade has shown that only about 60% of all screened individuals are retained for RNA confirmatory testing,[5] representing a major loss along hepatitis C cascade of care framework. To improve opportunities for earlier identification and linkage to care for the broader population, technical innovations are required to create an HCV test that can be completed with definitive results during the patient visit.[6] Such a point-of-care (POC) test requires integrating patient sample preparation and nucleic acid amplification test (NAAT) into a single disposable device. Traditional microfluidic approaches utilizing microchannel-based architecture have struggled to offer a scalable solution to assay integration, due to their dependence on complex device fabrication and instrumentation.[7-9]

Recent innovation in assay miniaturization and integration via droplet magnetofluidics (DM) create an opportunity to surmount these technical challenges.[10,11] DM technology replaces bulk fluid transport with magnetic particle manipulation through static discrete microliter droplets, enabling integration of bioassays without the need for complex fluidic cartridges and supporting instrumentation. Magnetic particles are capable of transporting, mixing and separating liquid reagents on small devices ranging from soft lithography-based devices,[9,12,13] glass-based substrates[14-16] to thermoplastic cartridges,[17] facilitating a novel approach to miniaturize and integrate laboratory-bound processes such as nucleic acid extraction on a single device.

To date, assay integration using DM was confined to designs utilizing a single planar substrate for particle manipulation and reagent confinement. Planar substrates offer a favorable interface for particle actuation, whether performed manually by hand,[9,12,15] electromechanically-actuated[16,17] or electromagnetic[13,14] approaches. However, planar design also presents a major challenge for biochemical assays. Specifically, the limited capacity for thermal isolation makes processes such as quantitative PCR and melting curve analysis difficult to implement in a precise and scalable manner. In the case of HCV, quantification of viral RNA in blood serum is an important factor in the evaluation of a patient's response to treatment and genotype is a strong predictor for HCV prognosis and responsiveness to treatment.[18] Implementation of a quantitative reverse-transcription PCR (qRT-PCR) assay requires thermal cycling with precise control and sufficient heating/cooling rates to complete within a practical time frame. Achieving these goals requires a decoupling of DM manipulation from reagent confinement, in order to combine the benefits of a dedicated thermal cycling module and a DM-enabled sample preparation module.

Two of the current inventors previously provided a "Self-Contained Cartridge and Methods for Integrated Biochemical Assay at the Point-of-Care", U.S. Pat. No. 9,463,461, issued Oct. 11, 2016; which is assigned to the same assignee as the current application. The entire contents of this patent are incorporated herein by reference. However, one problem with this previous device was the degree to which temperature within one or more wells of the cartridge could be controlled during use. Therefore, there remains a need for improved methods and devices for magnetic particle-driven biochemical assays.

SUMMARY

An embodiment of the current invention relates to a magnetofluidic device for assaying a nucleic acid sequence or other biomolecule from a sample, the device having: a cartridge assembly structured to accept and secure a magnetofluidic cartridge to be used for the assaying; and a magnetic particle manipulation assembly arranged proximate the cartridge assembly, the magnetic particle manipulation assembly having a pair of magnets arranged to be on opposing sides of the magnetofluidic cartridge and which are substantially aligned along a line that will be transverse to the magnetofluidic cartridge such that the line can be aligned with a well in the magnetofluidic cartridge. The pair of magnets are at least one of moveable along the line relative to the magnetofluidic cartridge, or a strength of the pair of magnets is adjustable such that a plurality of magnetic particles when contained within the well can be drawn out of and back into the well during operation.

An embodiment of the current invention relates to a magnetofluidic cartridge for assaying a nucleic acid sequence or other biomolecule from a sample, the cartridge including: a top layer; and a bottom layer spaced apart from the top layer in a generally parallel orientation with respect to the top layer, the bottom layer defining a plurality of wells therein that protrude from a surface of the bottom layer. The at least one of the plurality of wells having a wall sufficiently thin to allow a heat transfer rate such that a nucleic acid amplification assay can be completed in under 20 minutes.

An embodiment of the current invention relates to a method of detecting a biomolecule in a sample, including: loading the sample into a sample well of a magnetofluidic cartridge so as to contact the biomolecule with a magnetic particle such that the biomolecule binds to the magnetic particle; manipulating the magnetic particle bound to the biomolecule along a first degree of freedom so as to be able to draw the magnetic particle bound to the biomolecule out of the sample well and into a spacer layer of said magnetofluidic cartridge; manipulating the magnetic particle bound to the biomolecule along a second degree of freedom so as to be able translocate the magnetic particle bound to the biomolecule within the spacer layer to a position above a detection well of the magnetofluidic cartridge; manipulating the magnetic particle bound to the biomolecule along the first degree of freedom so as to be able to draw the magnetic particle bound to the biomolecule out of spacer layer and into the detection well; heating the biomolecule such that amplification of the biomolecule occurs; and detecting the biomolecule.

An embodiment of the current invention relates to a method of assembling a magnetofluidic cartridge including: forming a first layer defining a plurality of wells therein that protrude from a surface of the bottom layer; forming a second layer defining an inlet for injection of a sample into one of the plurality of wells; and sealing the first layer to the second layer such that the first layer and the second layer are configured to reserve a space located between the first layer and the second layer. Forming the first layer includes heating and molding a first film, forming the second layer includes laser cutting a second film. At least one of the plurality of wells includes a wall sufficiently thin to allow a heat transfer rate such that a nucleic acid amplification assay can be completed in under 20 minutes.

BRIEF DESCRIPTION OF THE DRAWINGS

Further objectives and advantages will become apparent from a consideration of the description, drawings, and examples.

DETAILED DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification, including the Background and Detailed Description sections, are incorporated by reference as if each had been individually incorporated.

As used throughout, the term "biomolecule" refers to one or more of a protein, a nucleic acid, a carbohydrate, or a lipid. In some embodiments, the term "biomolecule" refers to a protein, an amino acid sequence, or a nucleic acid sequence. In some embodiments, the biomolecule is obtained from a biological sample.

Figures 1A, 1B:
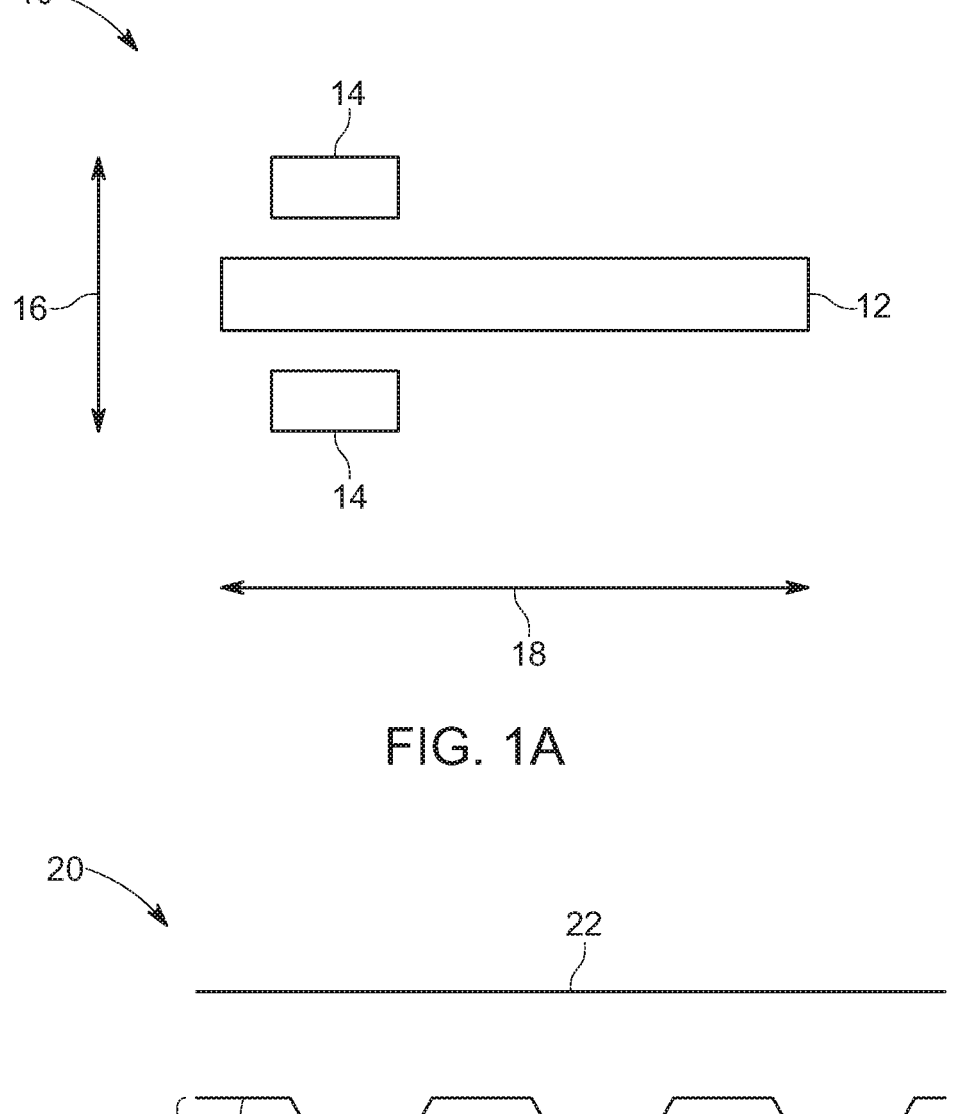
FIG. 1A is an illustration of a magnetofluidic device according to an embodiment of the invention.
FIG. 1B is an illustration of a magnetofluidic cartridge according to an embodiment of the invention.

FIG. 1A is an illustration of a magnetofluidic device 10 for assaying a biomolecule from a sample according to an embodiment of the invention. The magnetofluidic device of FIG. 1A includes a cartridge assembly 12 structured to accept and secure a magnetofluidic cartridge to be processed; and a magnetic particle manipulation assembly 14 arranged proximate said cartridge assembly. The magnetic particle manipulation assembly includes a pair of magnets 14 arranged to be on opposing sides of the magnetofluidic cartridge and substantially aligned along a line 16 that will be transverse to the magnetofluidic cartridge such that the line can be aligned with a well in the magnetofluidic cartridge. In such an embodiment, the pair of magnets 14 are at least one of moveable along the line 16, or a strength of said pair of magnets is adjustable such that a plurality of magnetic particles when contained within the well can be drawn out of and back into the well during operation. In some embodiments, the magnetic particle manipulation assembly 14 is further structured to provide manipulation of the plurality of magnetic particles, after being drawn out of the well, along a second degree of freedom 18 so as to be able to move the plurality of magnetic particles from the well to a second well in the magnetofluidic cartridge.

FIG. 1B is an illustration showing a magnetofluidic cartridge 20 for assaying a biomolecule from a sample according to an embodiment of the invention. The magnetofluidic cartridge of FIG. 1B includes: a top layer 22; and a bottom layer 24 spaced apart from the top layer 22 in a generally parallel orientation with respect to the top layer 22. The bottom layer 24 defines a plurality of wells 26 therein that protrude from a surface of the bottom layer. In such an embodiment, at least one of the plurality of wells 28 has a wall 30 sufficiently thin to facilitate heat transfer such that a nucleic acid amplification assay is completed in under 20 minutes.

Figure 1C:
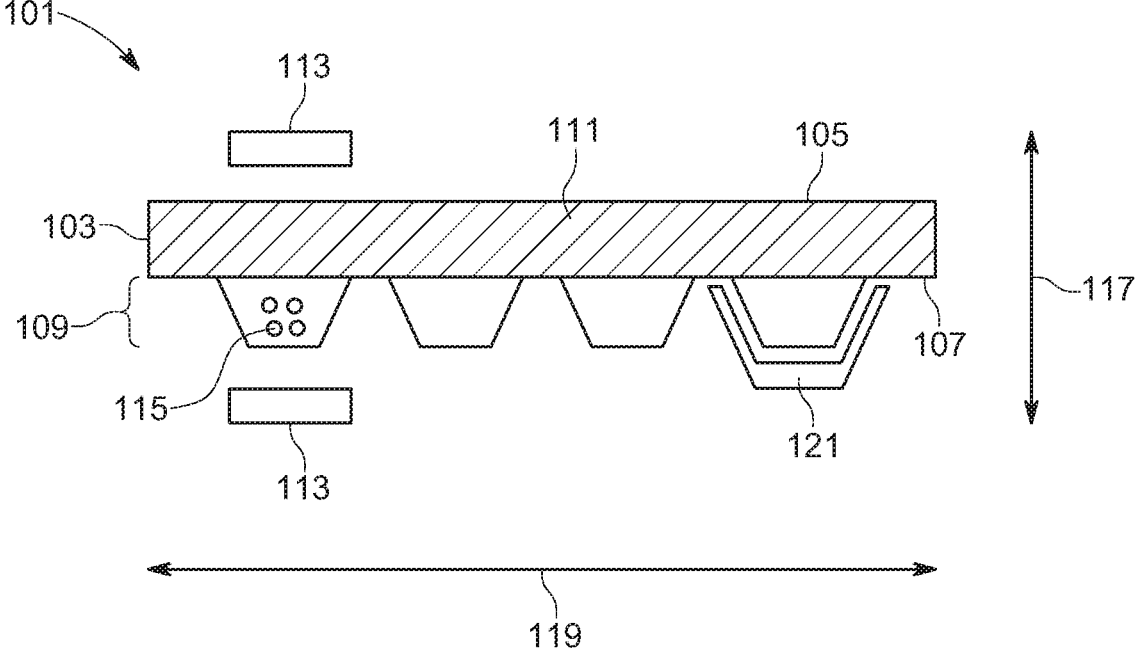
FIG. 1C is an illustration of a magnetofluidic device according to an embodiment of the invention.

FIG. 1C is an illustration of a magnetofluidic device according to an embodiment of the invention. The magnetofluidic device 101 of FIG. 1C includes a magnetofluidic cartridge 103 to be processed contained within a cartridge assembly (not shown) structured to accept and secure a magnetofluidic cartridge to be processed, the magnetofluidic cartridge having: a top layer 105; a bottom layer 107 spaced apart from the top layer in a generally parallel orientation with respect to the top layer, the bottom layer defining a plurality of wells 109 therein that protrude from a surface of the bottom layer; and a spacer layer 111 between and in contact with the top and bottom layers at least along a periphery thereof to seal contents within the magnetofluidic cartridge. The magnetofluidic device also includes a magnetic particle manipulation assembly 113 arranged proximate the cartridge assembly, the magnetic particle manipulation assembly being structured to provide manipulation of magnetic particles 115 contained within the magnetofluidic cartridge along a first degree of freedom 117 so as to be able to draw magnetic particles into and out of each of the plurality of wells, wherein the magnetic particle manipulation assembly is further structured to provide manipulation of magnetic particles contained within the magnetofluidic cartridge along a second degree of freedom 119 so as to be able to move magnetic particles from one of the plurality of wells to another one of the plurality of wells. The magnetic particle manipulation assembly includes a pair of magnets 113 arranged to be on opposing sides of the magnetofluidic cartridge with one of the plurality of wells therebetween. The magnetofluidic device also includes a temperature control assembly 121 being configured to receive at least one of the plurality of wells.

Figure 2:
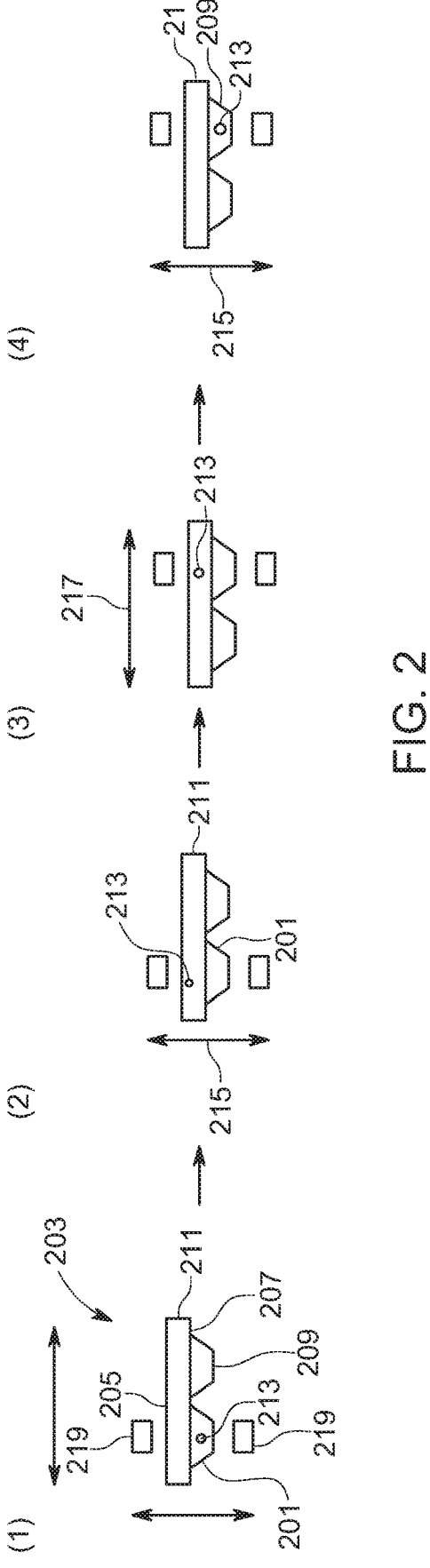
FIG. 2 is an illustration showing use of a magnetofluidic device according to an embodiment of the invention.

FIG. 2 is a schematic showing a method of detecting a nucleic acid sequence of a nucleic acid molecule in a sample, including the steps of: loading the sample into a sample well 201 of a magnetofluidic cartridge 203 so as to contact the nucleic acid molecule with a magnetic particle 213 such that the nucleic acid molecule binds to the magnetic particle 213 (step 1); manipulating the magnetic particle 213 bound to the nucleic acid molecule along a first degree of freedom 215 so as to be able to draw the magnetic particle bound to the nucleic acid molecule out of the sample well 201 and into a spacer layer 211 of the magnetofluidic cartridge (step 2); manipulating the magnetic particle 213 bound to the nucleic acid molecule along a second degree of freedom 217 so as to be able to translocate the magnetic particle bound to the nucleic acid molecule within the spacer layer to a position above a detection well of the magnetofluidic cartridge (step 3); manipulating the magnetic particle 213 bound to the nucleic acid molecule along the first degree of freedom 215 so as to be able to draw the magnetic particle bound to the nucleic acid molecule out of spacer layer 211 and into the detection well 209 (step 4). The method also includes heating the nucleic acid molecule such that amplification of the nucleic acid sequence occurs; and detecting the nucleic acid sequence. In such an embodiment, manipulation of the magnetic particle bound to the nucleic acid along a first degree of freedom and manipulation of the magnetic particle bound to the nucleic acid along a second degree of freedom includes the use of a pair of magnets 219 arranged to be on opposing sides of the magnetofluidic cartridge with the sample well and the detection well therebetween.

An embodiment of the current invention relates to a magnetofluidic device for assaying a nucleic acid sequence or other biomolecule from a sample, the device having: a cartridge assembly structured to accept and secure a magnetofluidic cartridge to be used for the assaying; and a magnetic particle manipulation assembly arranged proximate the cartridge assembly, the magnetic particle manipulation assembly having a pair of magnets arranged to be on opposing sides of the magnetofluidic cartridge and which are substantially aligned along a line that will be transverse to the magnetofluidic cartridge such that the line can be aligned with a well in the magnetofluidic cartridge. The pair of magnets are at least one of moveable along the line relative to the magnetofluidic cartridge, or a strength of the pair of magnets is adjustable such that a plurality of magnetic particles when contained within the well can be drawn out of and back into the well during operation.

An embodiment of the current invention relates to the magnetofluidic device above, where the magnetic particle manipulation assembly is further structured to provide manipulation of the plurality of magnetic particles, after being drawn out of the well, along a second degree of freedom so as to be able to move the plurality of magnetic particles from the well to a second well in the magnetofluidic cartridge.

An embodiment of the current invention relates to the magnetofluidic device above, further having a temperature control assembly arranged proximate the cartridge assembly, the temperature control assembly having a heat exchange portion structured and arranged to be in thermal connection with at least one well in the magnetofluidic cartridge.

An embodiment of the current invention relates to the magnetofluidic device above, where the heat exchange portion is a heat block that has a shape that is at least partially complementary to a shape of the at least one well to provide an enhanced surface for heat exchange therethrough, and where the temperature control assembly further includes: a heater in thermal contact with the heat block; a temperature sensor in thermal contact with the heat block; a cooling system in thermal contact with the heat block; and a temperature control device configured to receive temperature signals from the temperature sensor and to provide control signals to the heater and the cooling system.

An embodiment of the current invention relates to the magnetofluidic device above, where the magnetic particle manipulation assembly further includes: a first actuator assembly operatively connected to the pair of magnets such that the pair of magnets can be moved in unison, back and forth along the line, and a second actuator assembly operatively connected to the pair of permanent magnets such that the pair of permanent magnets can be moved in unison from a location of the well to a location of a second well. The pair of magnets is a pair of permanent magnets.

An embodiment of the current invention relates to the magnetofluidic device above, where the second actuator assembly is a rotational assembly, the second degree of freedom being a rotational degree of freedom.

An embodiment of the current invention relates to the magnetofluidic device above, where the pair of magnets is a pair of electromagnets configured to provide an electronically adjustable magnetic field therebetween.

An embodiment of the current invention relates to the magnetofluidic device above, further including a detection system arranged proximate the cartridge assembly so as to be able to detect a physical parameter for a test concerning the biomolecule.

An embodiment of the current invention relates to the magnetofluidic device above, further including a temperature control assembly arranged proximate the cartridge assembly, the temperature control assembly having a heat exchange portion structured and arranged to be in thermal connection with at least one well in the magnetofluidic cartridge.

An embodiment of the current invention relates to the magnetofluidic device above, where the detection system includes: an optical source arranged to illuminate a sample well to excite fluorescent molecules therein, and an optical detector arranged to detect fluorescence emissions from the sample well.

An embodiment of the current invention relates to the magnetofluidic device above, where the detection system includes a confocal epifluorescence detector.

An embodiment of the current invention relates to the magnetofluidic device above, where the magnetofluidic device is a portable device.

An embodiment of the current invention relates to the magnetofluidic device above, where the magnetofluidic device is a handheld device.

An embodiment of the current invention relates to a magnetofluidic cartridge for assaying a nucleic acid sequence or other biomolecule from a sample, the cartridge including: a top layer; and a bottom layer spaced apart from the top layer in a generally parallel orientation with respect to the top layer, the bottom layer defining a plurality of wells therein that protrude from a surface of the bottom layer. The at least one of the plurality of wells having a wall sufficiently thin to allow a heat transfer rate such that a nucleic acid amplification assay can be completed in under 20 minutes.

An embodiment of the current invention relates to the magnetofluidic cartridge above, where one of the plurality of wells has a wall of between 0.05-0.5 mm in thickness.

An embodiment of the current invention relates to the magnetofluidic cartridge above, further including a spacer layer between and in contact with the top and bottom layers at least along a periphery thereof to seal contents within the magnetofluidic cartridge.

An embodiment of the current invention relates to the magnetofluidic cartridge above, where further including a plurality of magnetic particles preloaded into at least one of the plurality of wells, where the at least one of the plurality of wells is a sample well having a port for disposing a sample therein during use, and where the plurality of magnetic particles are coated magnetic nanoparticles that are coated so as to adhere to nucleic acids or other biomolecules via electrostatic or intermolecular forces.

An embodiment of the current invention relates to the magnetofluidic cartridge above, further having: a plurality of processing fluids each preloaded in a respective one of the plurality of wells; and a sealing fluid preloaded into the magnetofluidic cartridge between the top and bottom layers. The sealing fluid is immiscible with the plurality of processing fluids so as to provide containment of each of the plurality of processing fluids in a respective one of the plurality of wells, and the sealing fluid is hydrophobic.

An embodiment of the current invention relates to the magnetofluidic cartridge above, where each of the plurality of processing fluids preloaded into the magnetofluidic cartridge are selected in number and type according to the test to be performed.

An embodiment of the current invention relates to the magnetofluidic cartridge above, where at least one of the plurality of processing fluids includes a reagent for a nucleic acid amplification assay.

An embodiment of the current invention relates to the magnetofluidic cartridge above, where the magnetofluidic cartridge is self-contained and remains sealed other than to receive a sample during an entirety of the nucleic acid amplification assay.

An embodiment of the current invention relates to a method of detecting a biomolecule in a sample, including: loading the sample into a sample well of a magnetofluidic cartridge so as to contact the biomolecule with a magnetic particle such that the biomolecule binds to the magnetic particle; manipulating the magnetic particle bound to the biomolecule along a first degree of freedom so as to be able to draw the magnetic particle bound to the biomolecule out of the sample well and into a spacer layer of said magnetofluidic cartridge; manipulating the magnetic particle bound to the biomolecule along a second degree of freedom so as to be able translocate the magnetic particle bound to the biomolecule within the spacer layer to a position above a detection well of the magnetofluidic cartridge; manipulating the magnetic particle bound to the biomolecule along the first degree of freedom so as to be able to draw the magnetic particle bound to the biomolecule out of spacer layer and into the detection well; heating the biomolecule such that amplification of the biomolecule occurs; and detecting the biomolecule.

An embodiment of the current invention relates to the method above, where the manipulating the magnetic particle bound to the biomolecule along a first degree of freedom and the manipulating the magnetic particle bound to the biomolecule along a second degree of freedom includes the use of a pair of magnets arranged to be on opposing sides of said magnetofluidic cartridge with the sample well and said detection well therebetween.

An embodiment of the current invention relates to the method above, where amplifying the biomolecule includes the use of a temperature control assembly arranged proximate the cartridge assembly and being structured to receive the detection well in a heat exchange portion of the temperature control assembly.

An embodiment of the current invention relates to the method above, where heating the biomolecule includes heating the biomolecule such that amplification of the biomolecule occurs in under 20 minutes.

An embodiment of the current invention relates to a method of detecting a nucleic acid sequence of a nucleic acid molecule in a sample, including: loading the sample into a sample well of a magnetofluidic cartridge so as to contact the nucleic acid molecule with a magnetic particle such that the nucleic acid molecule binds to the magnetic particle; manipulating the magnetic particle bound to the nucleic acid molecule along a first degree of freedom so as to be able to draw the magnetic particle bound to the nucleic acid molecule out of the sample well and into a spacer layer of the magnetofluidic cartridge; manipulating the magnetic particle bound to the nucleic acid molecule along a second degree of freedom so as to be able translocate the magnetic particle bound to the nucleic acid molecule within the spacer layer to a position above a detection well of the magnetofluidic cartridge; manipulating the magnetic particle bound to the nucleic acid molecule along the first degree of freedom so as to be able to draw the magnetic particle bound to the nucleic acid molecule out of spacer layer and into the detection well; heating the nucleic acid molecule such that amplification of the nucleic acid sequence occurs; and detecting the nucleic acid sequence.

An embodiment of the current invention relates to the method of detecting a nucleic acid sequence of a nucleic acid molecule in a sample above, where the manipulating the magnetic particle bound to the nucleic acid molecule along a first degree of freedom and the manipulating the magnetic particle bound to the nucleic acid molecule along a second degree of freedom includes the use of a pair of magnets arranged to be on opposing sides of the magnetofluidic cartridge with the sample well and the detection well therebetween.

An embodiment of the current invention relates to the method of detecting a nucleic acid sequence of a nucleic acid molecule in a sample above, where the amplifying the nucleic acid sequence includes the use of a temperature control assembly arranged proximate the cartridge assembly and being structured to receive the detection well in a heat exchange portion of the temperature control assembly.

An embodiment of the current invention relates to the method of detecting a nucleic acid sequence of a nucleic acid molecule in a sample above, where the heating the nucleic acid includes heating the nucleic acid such that amplification of the nucleic acid occurs in under 20 minutes.

An embodiment of the current invention relates to a method of assembling a magnetofluidic cartridge including: forming a first layer defining a plurality of wells therein that protrude from a surface of the bottom layer; forming a second layer defining an inlet for injection of a sample into one of the plurality of wells; and sealing the first layer to the second layer such that the first layer and the second layer are configured to reserve a space located between the first layer and the second layer. Forming the first layer includes heating and molding a first film, forming the second layer includes laser cutting a second film. At least one of the plurality of wells includes a wall sufficiently thin to allow a heat transfer rate such that a nucleic acid amplification assay can be completed in under 20 minutes.

An embodiment of the current invention relates to the method of assembling a magnetofluidic cartridge above, further including loading a plurality of magnetic particles into at least one of the plurality of wells prior to sealing the first layer to the second layer.

An embodiment of the current invention relates to the method of assembling a magnetofluidic cartridge above, further including loading at least one fluid into each of the plurality of wells prior to sealing the first layer to the second layer.

An embodiment of the current invention relates to the method of assembling a magnetofluidic cartridge above, further including loading a sealing fluid between the first layer and the second layer prior to sealing the first layer to the second layer.

An embodiment of the current invention relates to the method of assembling a magnetofluidic cartridge above, where the first layer includes polymethylmethacrylate (PMMA), polypropylene (PP), polyethylene terephthalate (PET), polyethylene terephthalate glycol (PETG), high density polyethylene (HDPE), polytetrafluoroethylene (PTFE), and/or polycarbonate (PC).

An embodiment of the current invention relates to the method of assembling a magnetofluidic cartridge above, where the second layer includes polymethylmethacrylate (PMMA), polypropylene (PP), polyethylene terephthalate (PET), polyethylene terephthalate glycol (PETG), high density polyethylene (HDPE), polytetrafluoroethylene (PTFE), and/or polycarbonate (PC).

An embodiment of the current invention relates to the method of assembling a magnetofluidic cartridge above, where the first layer is between 1.00-8.00 mm in thickness.

An embodiment of the current invention relates to the method of assembling a magnetofluidic cartridge above, where the second layer is between 0.05-3 mm in thickness.

An embodiment of the current invention relates to the method of assembling a magnetofluidic cartridge above, where the sealing fluid includes oil, air and wax.

An embodiment of the current invention relates to the method of assembling a magnetofluidic cartridge above, further including passivating a surface of the plurality of wells prior to sealing the first layer to the second layer.

Some embodiments of the current invention are directed to a method for the design and fabrication of a consumable device for use in magnetic particle-driven biochemical assays. Some embodiments of the current invention can improve substantially on previously disclosed technology (U.S. Pat. No. 9,463,461) by enabling biochemical processes which require thermal control, e.g. Polymerase Chain Reaction (PCR) or High Resolution Melting Analysis (HRMA). Some aspects of this invention can include, but are not limited to, the following features:

A device consisting of 1) a planar hydrophobic substrate for particle transport and 2) a substrate with one or more extruded space for retention and isolation of one or more biochemical reagents; where the said extruded space includes a thin-walled feature (<0.75 mm in thickness) in relation to the exterior of the device; where the biochemical reagents isolated within the confines of the said extruded space, sharing an interface with a common phase (e.g. air, oil); where the common phase is in contact with each reagents as well as a planar hydrophobic substrate.

A method of particle transport, where one or more magnetic particles are manipulated in two dimensions. The first dimension is defined by the extent of transverse motion of magnetic particles between the innermost part of the extruded feature and the planar hydrophobic substrate. The second dimension is defined by the extent of longitudinal motion of magnetic particles along the planar hydrophobic substrate. Particle extraction, translocation and re-suspension facilitated by magnetic actuation in a combination of the two dimensions, where a two-axis mechanical manipulator is an embodiment.

A method of modulating temperature contained within one or more extruded features to facilitate a biochemical process. An example of such a biochemical process may include but is not limited to PCR, Loop Mediated Isothermal Amplification (LAMP), Helicase Dependent Assay (HAD), Rolling Circle Amplification Assay (RCA), Recombinase Polymerase Amplification (RPA), Reverse-Transcription Polymerase Chain reaction (RT-PCR), Specific High-Sensitivity Enzymatic Reporter UnLOCKing (SHERLOCK), DNA endonuclease-targeted CRISPR trans reporter (DETECTR), bacterial culture and HRMA.

An example of temperature modulation may include but is not limited to contact heating, radiative heating and photothermal heating.

FIGS. 1A-1C and 2 provide schematic illustrations of devices and methods of using the devices according to some embodiments of the current invention. A magnetofluidic device for testing biological samples according to an embodiment of the current invention includes a cartridge assembly structured to accept and secure a magnetofluidic cartridge to be processed, the magnetofluidic cartridge has a plurality of wells including at least a sample well and a detection well each of which protrudes beyond a surface of the magnetofluidic cartridge; and a magnetic particle manipulation assembly arranged proximate the cartridge assembly, the magnetic particle manipulation assembly being structured to provide manipulation of magnetic particles contained within the magnetofluidic cartridge along a first degree of freedom so as to be able to draw magnetic particles into and out of each of the plurality of wells. The magnetic particle manipulation assembly is further structured to provide manipulation of magnetic particles contained within the magnetofluidic cartridge along a second degree of freedom so as to be able to move magnetic particles from one of the plurality of wells to another one of the plurality of wells.

The magnetofluidic device can further include a detection system arranged proximate the cartridge assembly so as to be able to detect a physical parameter for a test concerning a genetic sample. The magnetofluidic device can further include a temperature control assembly arranged proximate the cartridge assembly that is also structured to receive at least the detection well in a heat exchange portion of the temperature control assembly. In some embodiments, the temperature control assembly includes a heat block defining the heat exchange portion therein for receiving the sample well, a heater in thermal contact with the heat block, a temperature sensor in thermal contact with the heat block, a cooling system in thermal contact with the heat block, and a temperature control device configured to receive temperature signals from the temperature sensor and to provide control signals to the heater and the cooling system.

In some embodiments, the magnetic particle manipulation assembly includes a pair of permanent magnets arranged to be on opposing sides of the magnetofluidic cartridge with one of the plurality of wells therebetween, a first actuator assembly operatively connected to the pair of permanent magnets such that the pair of permanent magnets can be moved in unison, back and forth along an axis to move magnetic particles into and out of one of the plurality of wells, and a second actuator assembly operatively connected to the pair of permanent magnets such that the pair of permanent magnets can be moved in unison from a location of one of the plurality of wells therebetween to a location with a second one of the plurality of wells therebetween. In some embodiments, the second actuator assembly is a rotational assembly such that the second degree of freedom is a rotational degree of freedom.

In some embodiments, the detection system includes an optical source arranged to illuminate the sample well to excite fluorescent molecules therein, and an optical detector arranged to detect fluorescence emissions from the sample well. In some embodiments, the detection system is or includes a confocal epifluorescence detector.

In some embodiments, the magnetofluidic device further includes a cartridge according.

In some embodiments, the magnetofluidic device is a portable device. In some embodiments, the magnetofluidic device is a handheld device.

In some embodiments, a magnetofluidic cartridge for a magnetofluidic device for testing genetic samples includes a top layer; a bottom layer spaced apart from the top layer in a generally parallel orientation with respect to the top layer; and a spacer layer between and in contact with the top and bottom layers at least along a periphery thereof to seal contents within the magnetofluidic cartridge. The bottom layer defines a plurality of wells therein that protrude from a surface of the bottom layer.

In some embodiments, the magnetofluidic cartridge can further include a plurality of processing fluids each preloaded in a respective one of the plurality of wells; and a sealing fluid preloaded into the magnetofluidic cartridge between the top and bottom layers. The sealing fluid is immiscible with the plurality of processing fluids so as to provide containment of each of the plurality of processing fluids in a respective one of the plurality of wells. In some embodiments, the magnetofluidic cartridge can further include magnetic particles preloaded into at least one of the plurality of wells. This can be a sample well having a port for disposing a sample therein during use. The magnetic particles can be coated magnetic nanoparticles that adhere electrostatically to genetic material. Each of the plurality of processing fluids can be preloaded into the magnetofluidic cartridge and can be selected in number and type according to the test to be performed.

In some embodiments, the magnetofluidic cartridge has a plurality of wells where at least one of the wells has a thin wall to allow for rapid and efficient temperature control during a nucleic acid amplification assay. This allows for the nucleic acid assay to proceed in under 30, 25, 20, 15, 10, or 5 minutes.

In some embodiments, the magnetofluidic device includes a magnetic particle manipulation assembly having a pair of permanent magnets arranged to be on opposing sides of a magnetofluidic cartridge with one of a plurality of wells therebetween. The magnetic particle manipulation assembly has a first actuator assembly operatively connected to the pair of permanent magnets such that the pair of permanent magnets can be moved in unison, back and forth along an axis to move magnetic particles into and out of the one of the plurality of wells, and a second actuator assembly operatively connected to the pair of permanent magnets such that the pair of permanent magnets can be moved in unison from a location of the one of the plurality of wells therebetween to a location with a second one of the plurality of wells therebetween. Such a conformation allows the device to be used with a variety of cartridges having a variety of shaped wells. Also, such a conformation allows for the transport of a magnetic particle bound to a nucleic acid sample from a first aqueous solution in a first well, through a hydrophobic solution, and then into a second aqueous solution in a second well. Such a process allows for the removal of excess solution from the first well prior to entry into the second well.

In some embodiments, the magnetofluidic device is hand held and allows for the extraction of nucleic acids from a sample, the amplification of these nucleic acids, and their subsequent detection on a single platform.

EXAMPLES

The following describes some concepts of the current invention with reference to particular embodiments. The general concepts of the current invention are not limited to the examples described.

Example 1

Gold standard quantitative nucleic acid tests for diagnosis of viral diseases are currently limited to implementation in laboratories outside of the clinic. An instrument for conducting nucleic acid testing at the point-of-care (POC) that is easily operable by the clinician would reduce the required number of visits to the clinic and improve patient retention for proper treatment. In this example, a droplet magnetofluidic (DM) platform is presented, which leverages functionalized magnetic particles to miniaturize and automate laboratory assays for use in the clinic at the POC. The novel thermoformed disposable cartridge coupled to a portable multiaxial magnetofluidic instrument enables real-time PCR assays for quantitative and sensitive detection of nucleic acids from crude biosamples. Instead of laborious benchtop sample purification techniques followed by elution and spiking into PCR buffer, the user simply injects the biosample of interest into a cartridge with magnetic particles and loads the cartridge into the instrument. The utility of the platform is demonstrated with hepatitis C (HCV) RNA viral load quantification from blood serum in approximately 1 hour. Clinical blood serum samples (n=18) were directly processed on cartridges with no false positives and a limit of detection of 45 IU per 10 µL sample injection.

The sample-to-answer qRT-PCR system for HCV diagnosis described here utilizes a thermoformed plastic cartridge. The extruded well design of the cartridge enables precise rapid thermal control of reagents at suitable ranges for PCR thermal cycling and melt curve analysis. DM sample processing enables the necessary purification of nucleic acid targets from clinical samples to obtain quantitative and consistent assay results. The DM-PCR platform demonstrates high analytical sensitivity with HCV RNA positive samples ranging from 6,000,000 IU/mL down to approximately 45 IU in blood serum (equivalent to 4500 IU/mL) and shows high correlation with laboratory-based viral quantification and benchtop PCR. Patients experiencing chronic infection typically have viral counts on the order of $10^5$-$10^7$ IU/mL and desired responses to treatment are characterized by orders of magnitude decreases in the viral load.[19,20] Therefore, the sensitivity of the platform is suitable for detecting most cases of chronic HCV infection with sufficient capacity for viral load quantitation to evaluate patient responses to treatment.

Results

Droplet Magnetofluidic PCR (DM-PCR) Platform Overview

Two of the major technical bottlenecks in the implementation of qRT-PCR diagnostic tests include 1) laborious sample processing steps for nucleic acid purification, and 2) the need for trained laboratory personnel to operate instruments for complex biological assays. The DM-PCR instrument overcomes both issues by automating sample processing on magnetic particles within a single cartridge to couple nucleic acid purification directly with temperature control for enzymatic amplification and fluorescence detection for quantitation and melt analysis. Operation requires only a single injection of biosample such as blood serum mixed with magnetic particles into a cartridge followed by insertion into the instrument to initiate an assay (FIG. 3A).

DM manipulation of the injected sample is facilitated by a dual-axis (Z-θ) actuator, which drives mechanical displacement of two permanent magnets using microcontroller-driven RC servomotors. Vertical displacement (Z) is achieved via linear RC actuation, while radial displacement (θ) is achieved on a conventional rotary RC servo. Thermal control is implemented by a faceplate that mounts directly onto the well of the cartridge containing the PCR buffer. A thermoelectric (TE) element-driven miniature heat block heats and cools the PCR well with temperature feedback from a thermistor probe embedded directly in the heat block. Optical detection utilizes a miniaturized confocal fluorescence detector at a fixed distance from the PCR well. Transparency of the top layer of the assay cartridge enables sensitive detection of fluorophores over a dynamic range calibrated to 0.5-50 nM fluorescein. The three modules are controlled by an Arduino microcontroller and interfaces via serial communication to a Java-based control software. FIG. 3B is a schematic of all internal components of the instrument.

Figures 3A, 3B:
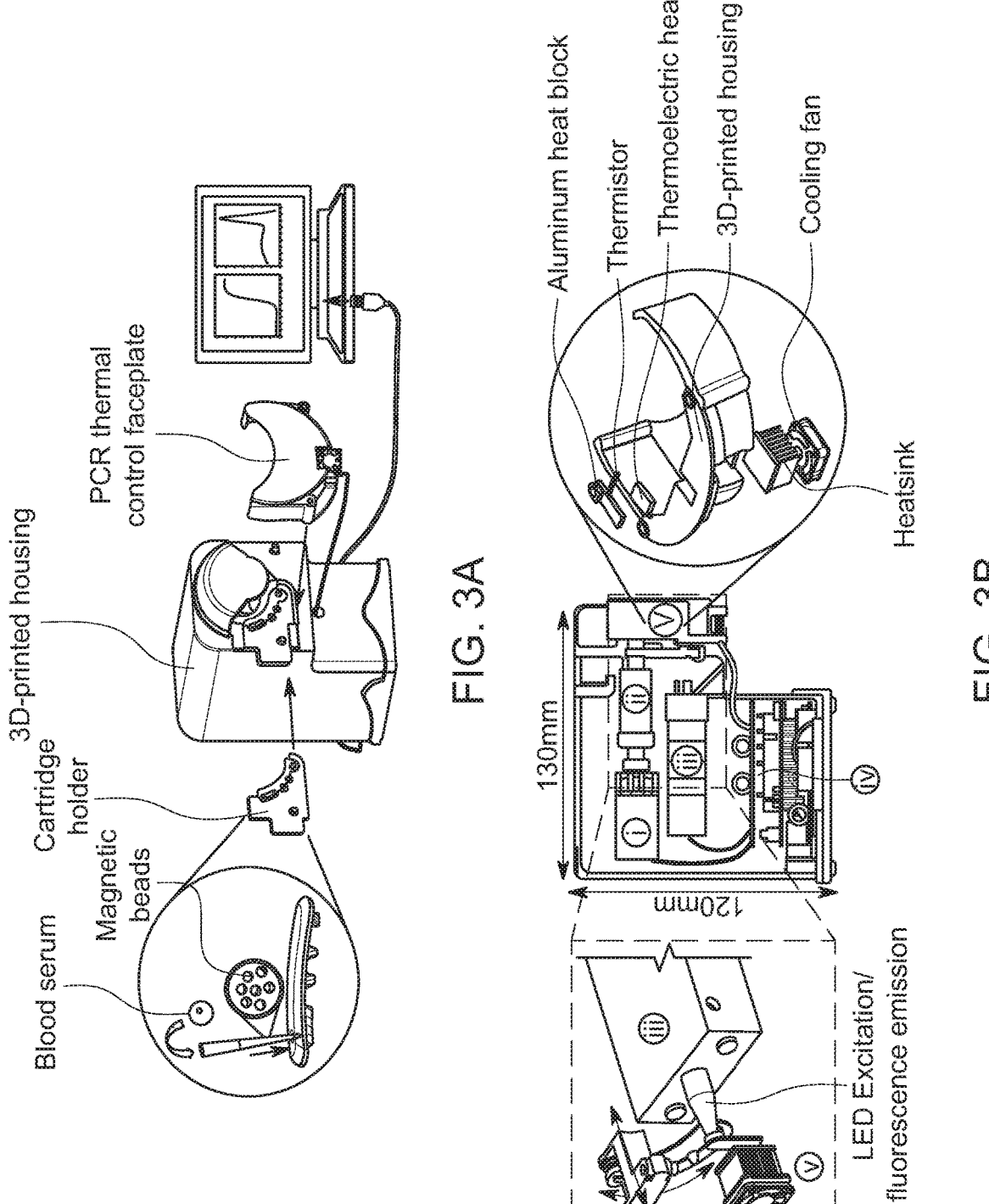
FIGS. 3A and 3B are schematics and illustrations showing the components and functionality of a magnetofluidic device according to an embodiment of the invention.

FIGS. 3A and 3B are schematics and illustrations showing the components and functionality of a magnetofluidic device according to an embodiment of the invention. More specifically, FIG. 3A shows the complete user-operation steps illustrated from left to right including injection of serum with magnetic particles into the cartridge, cartridge mounting in a holder with insertion into the instrument, assembly of the faceplate onto the cartridge for thermal cycling, and USB readout of PCR results. FIG. 3B is a profile view of the instrument with ghosted housing reveals internal components including (i) rotational servo and (ii) linear servo for magnetic particle transferal between cartridge wells and in/out of reagent droplets respectively, (iii) confocal epifluorescence detector for PCR fluorescence acquisition, (iv) microcontroller electronics for integrated control of magnetic manipulation, algorithmic heating, triggering fluorescence detection, and serial communication for data storage and analysis, (v) PCR thermal control faceplate with a fan-cooled heatsinked thermoelectric heating element attached to an aluminum heat block that fits over the cartridge PCR well with an embedded thermistor probe for monitoring temperature.

Magnetic Actuation

Previous iterations of DM devices describe an essentially 1-dimensional system, where all reagents and passive barrier structures separating them are located on a single plane. Such a system only requires actuation along a single dimension (e.g. X, Y or θ) to perform magnetic particle transport across all reagents in the system. In the thermoformed magnetofluidic cartridge described here, extruded wells and an immiscible oil layer serve to separate and constrain reagents within discrete wells. In order to extract and transport particles, the ability to manipulate particles in and out of the extruded wells is required. The Z-θ manipulator facilitates automation of this process. Extension and retraction along the Z-axis draws magnetic particles in and out of the wells, while rotation (θ) provides transfer between wells. In the revised magnetofluidic manipulation scheme, as illustrated in FIG. 4C, the surface tension of the oil-water interface serves to sieve off excess immiscible solution encapsulating the particles for clean transfer between wells without compromising droplet integrity or mixing reagents (see FIG. 9).

Cartridge Design

Figure 4A:
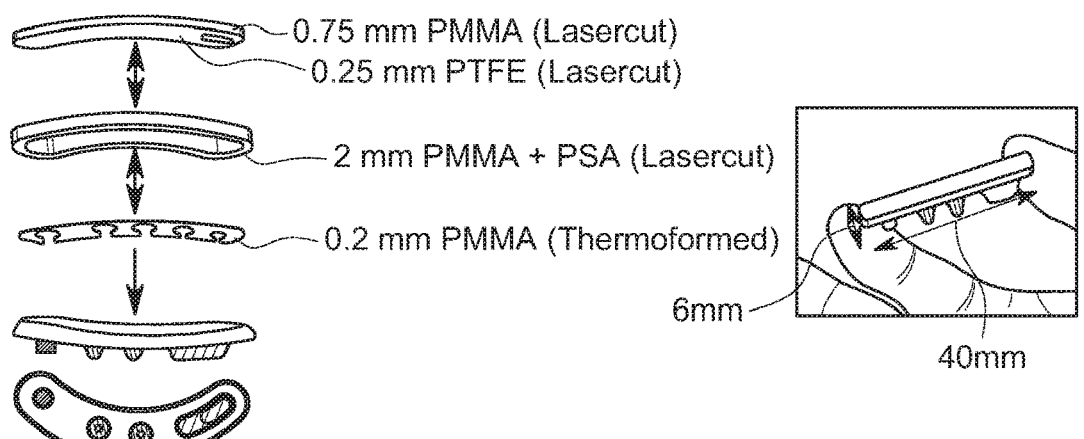
FIGS. 4A-4C are illustrations depicting a magnetofluidic cartridge design and functionality according to an embodiment of the invention.

The DM-PCR cartridge consists of 3 layers: a thermoformed reagent layer, a spacer, and a hydrophobic transport layer (FIG. 4A). The reagent layer utilizes a thin thermoplastic sheet to generate thin-walled extruded wells akin to conventional PCR tubes, facilitating rapid thermal control necessary for PCR-based assays. The spacer layer confers volume to the cartridge such that an immiscible layer of silicone oil insulates all reagents from the surrounding air and each other. The hydrophobic transport layer employs a poly(tetrafluoroethylene) (PTFE) coating to provide a common plane on which magnetic particles may slide with minimal friction or sample loss upon contact. Pre-loaded reagents and a leakproof seal facilitated by pressure-sensitive adhesive on either side of the spacer layer results in a compact, disposable product with "out-of-the-box" functionality.

Figure 4B:
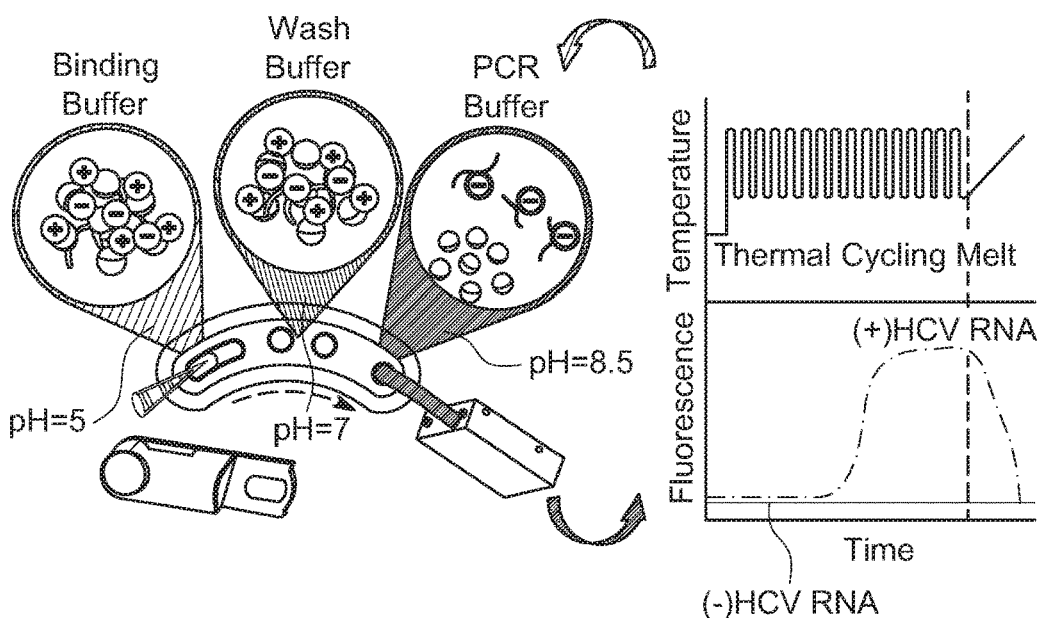
Figure 4C:
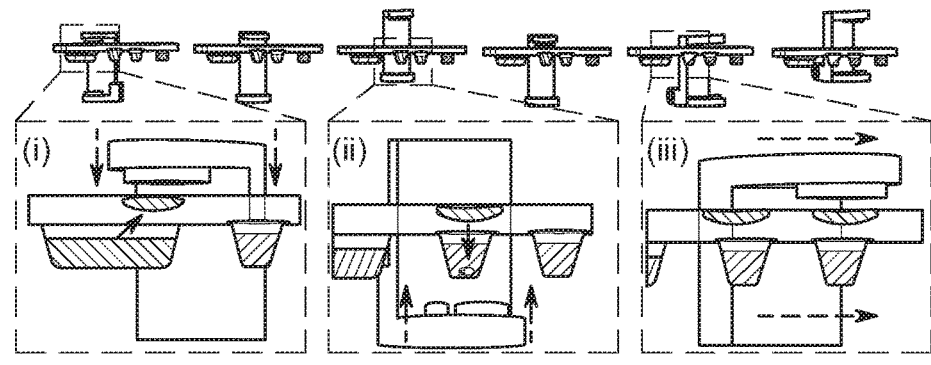

The cartridge demonstrated in this work contains four wells preloaded with droplets of a binding buffer, two wash buffers, and a PCR reaction mix. The assay, as illustrated in FIG. 4B, begins with injection of a sample (e.g. blood serum) mixed with pH-responsive magnetic particles into the first well through a port in the cartridge. This first well contains the acidic binding buffer, which induces a positive charge on the polyhistidine coating present on the particle surface. Electrostatic forces then cause binding between the magnetic particles and negatively-charged nucleic acids in solution. Blood-derived biosamples may contain numerous factors that are inhibitory to PCR such as IgG, hemoglobin, and lactoferrin.[21] Transfer of the particles through the two wash buffer wells ensures that inhibitory components from the sample are desorbed from the particles while the pH maintains the positive surface charge on the particles for subsequent transfer of the captured nucleic acids into the PCR solution. PCR solutions are inherently basic (pH 8.5), which neutralizes the magnetic particle surface charge for elution of sample nucleic acids. The magnetic particles are then transferred out of the well followed by PCR thermal cycling and melt curve analysis.

FIGS. 4A-4C are illustrations depicting cartridge design and functionality according to an embodiment of the invention. FIG. 4A shows that the cartridges are fabricated with three parts: a lasercut top layer of poly(methyl methacrylate) (PMMA) with a coating of poly(tetrafluoroethylene) (PTFE) tape for smooth particle plug transfer between wells, a middle laser cut layer of PMMA as a spacer for containing silicone oil in the transition region between wells, and a bottom vacuum-formed PMMA layer with extruded wells for containing reagents. Pressure sensitive adhesives (PSA) applied to both surfaces of the middle spacer generates a leak-proof seal upon cartridge assembly. FIG. 3B provides and overview of nucleic acid purification and PCR assay droplet reagents with their arrangement within cartridge wells. Samples of interest are injected with magnetic particles into the first well containing 40 μL of a binding buffer (pH=5) through an opening in the top of the cartridge. At this low pH, the polyhistidine coating of the magnetic particles is positively-charged, which allows binding to negatively-charged nucleic acids by electrostatic forces. Transfer of magnetic particles through two wash buffers (pH=7) purifies the captured nucleic acids via desorption of unbound cellular debris or proteins that may inhibit the PCR reaction. Final transfer into the PCR solution (pH=9) neutralizes the charge of the magnetic particle surface allowing for elution of nucleic acids for thermal cycling and subsequent melt analysis coupled with fluorescence detection. FIG. 4C is a schematic showing particle transfer actuation is accomplished by (i) descent of the upper magnet to draw particle plug into oil for collection at the PTFE surface, (ii) ascent of the lower magnet to introduce particle plug into reagent droplets, and (iii) magnet rotation for particle transfer between wells.

Figure 9:
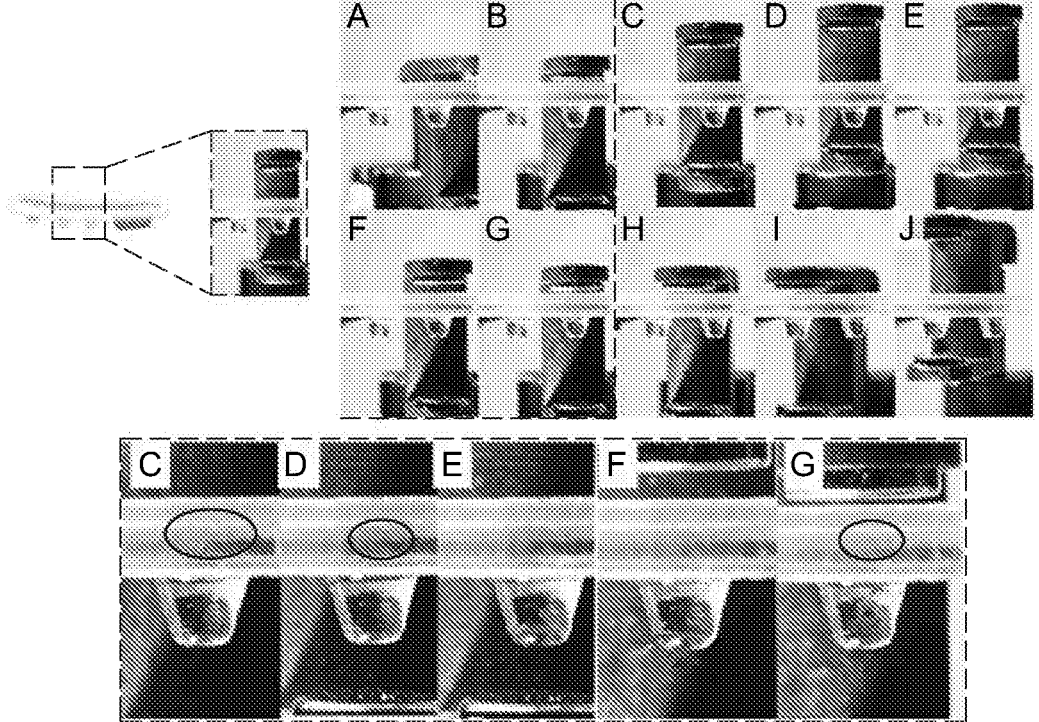
FIG. 9 is a series of images showing magnetic particle transfer according to an embodiment of the invention.

FIG. 9 is a series of images showing magnetic particle transfer. Panels A through J are chronological stills from a video of automated magnetic particle transfer from the binding buffer well into the first wash buffer well and the following transfer into the second wash buffer well. Close-ups of transfer into and out of the first wash buffer are provided for panels C through G. (A) Top magnet (magnet$_T$) has captured particles from binding buffer well and is rotating over the first wash well. (B) Particles are held against top PTFE coating with magnet$_T$ positioned above first wash well. (C-E) Raising the bottom magnet (magnet$_B$) draws particles (outlined in red ovals) off the top surface into wash buffer. Panel E close-up shows the particle plug immediately before surface tension with the aqueous buffer squeezes the silicone oil off the particles as evident by the slightly domed appearance. (F) Particles have flattened compared to panel E, indicating silicone oil coating has been squeezed off by the wash buffer. Magnet$_T$ has been lowered back down onto the top surface of the cartridge. (G) Particles are attracted to magnet$_T$ and coalesce at the PTFE surface. (H-J). Repeat A-D to transfer particles into second wash buffer.

Temperature Control in Thermoformed Assay Cartridge

Thermal cycling and predictable heat control presents various technical challenges for integrated implementation of PCR with assay preparation on a single cartridge. All elements of the assay must be accessible in a continuous path within the cartridge while providing a method for directing localized heating to the isolated PCR volume. Thermal cycling is a nontrivial operation for planar magnetofluidic devices due to geometrical constraints imposed by their planar design. Using thin, thermally conductive substrates such as glass coverslips can achieve smaller thermal gradient across the device substrate and will enable thermal cycling of PCR reagents on device, although the substantial thermal mass of all reagents on the substrate results in higher temperature ramp times and an extended reaction time compared to a conventional PCR system. In this work, these challenges were addressed with thermoformed extruded wells (FIG. 4A).

Thermoforming serves as a scalable fabrication method to easily generate thin-walled extruded wells for physical isolation of the PCR reagent. Extrusion of the wells facilitates an increase in the surface area of the heating element in direct contact with the incubation region of the cartridge. The materials chosen for the cartridge needed to be amenable to thermoforming, transmit light for fluorescence detection, and avoid inhibitory interactions with PCR components. Clear acrylic, poly(methyl methacrylate), was chosen for optical transparency, and compatibility with both laser-cutting and thermoforming techniques. Acrylic has been shown to inhibit PCR and prevented sensitive detection of nucleic acids in our cartridge.[22] This issue was circumvented by passivating the wells with silicone oil prior to loading reagents.

To transport heat to the cartridge, an aluminum heat block was machined to encompass the PCR well. The low-profile design of the heat block both reduces thermal mass for rapid heating by the attached thermoelectric element and permits sufficient range of movement by the magnet arm for magnetic sample exchange with the PCR well. Because the cartridge is completely enclosed during thermal cycling, monitoring the temperature of the PCR solution was done indirectly with a thermistor embedded into the heat block adjacent to the well. The temperature correspondence between the thermistor reading and PCR solution temperature was found to follow a linear trend by embedding a second thermistor within the PCR well of a test cartridge. Temperature targets were calibrated accordingly to follow this trend and thermal cycling accuracy and consistency was evaluated using both an embedded thermistor within the cartridge and a finite-element heat transfer simulation (FIGS. 5A and 5B, and FIGS. 6A-6C).

Figure 5A:
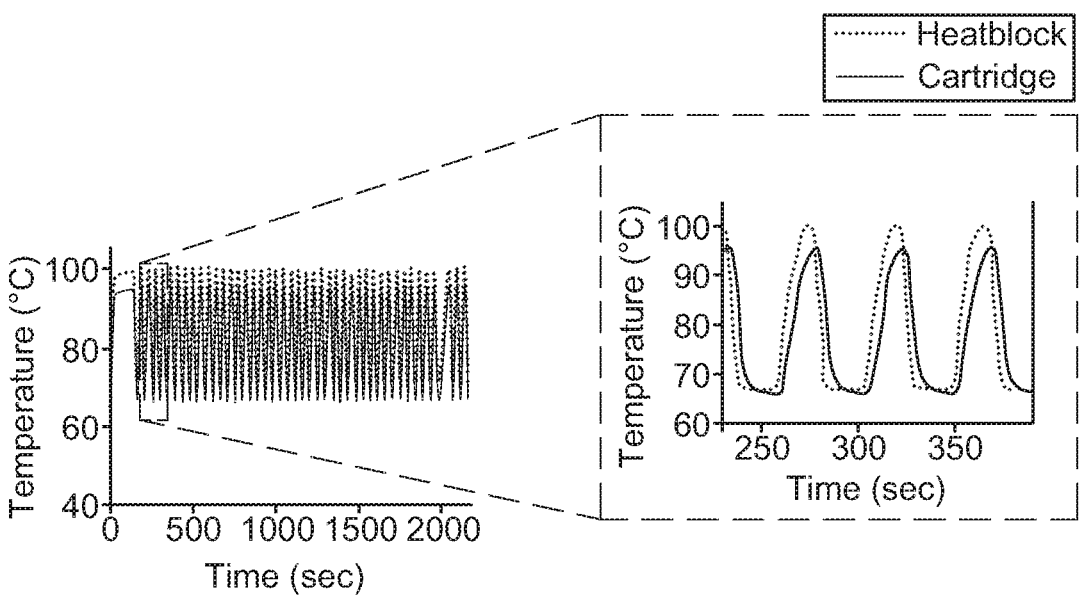
FIGS. 5A and 5B are graphs showing PCR temperature consistency according to an embodiment of the invention.
Figure 5B:
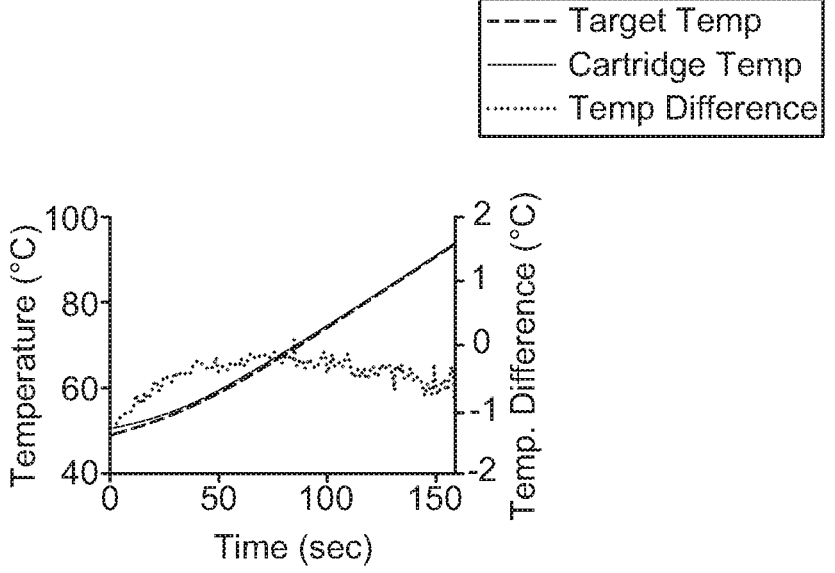

FIGS. 5A and 5B are graphs showing PCR temperature consistency according to an embodiment of the invention. FIG. 5A shows a thermal cycling profile as measured by thermistors within the heat block (dashed line) and embedded within a test cartridge PCR well (solid line). PCR assays demonstrated here used a 2-minute hot-start at 95° C. followed by 45 cycles of 20 seconds at 65° C. anneal and 5 seconds at 95° C. denature. FIG. 5b shows a temperature ramp profile from demonstrating close agreement between the targeted temperature with the actual measured temperature in the cartridge with error measuring <1° C. throughout the relevant range of temperatures for melt analysis of amplified nucleic acid products.

Figure 6A:
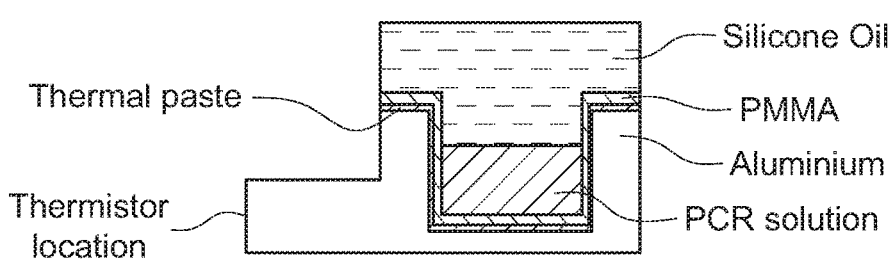
FIGS. 6A-6C are illustrations and heat maps showing PCR Thermal Cycling Characterization according to an embodiment of the invention.
Figure 6B:
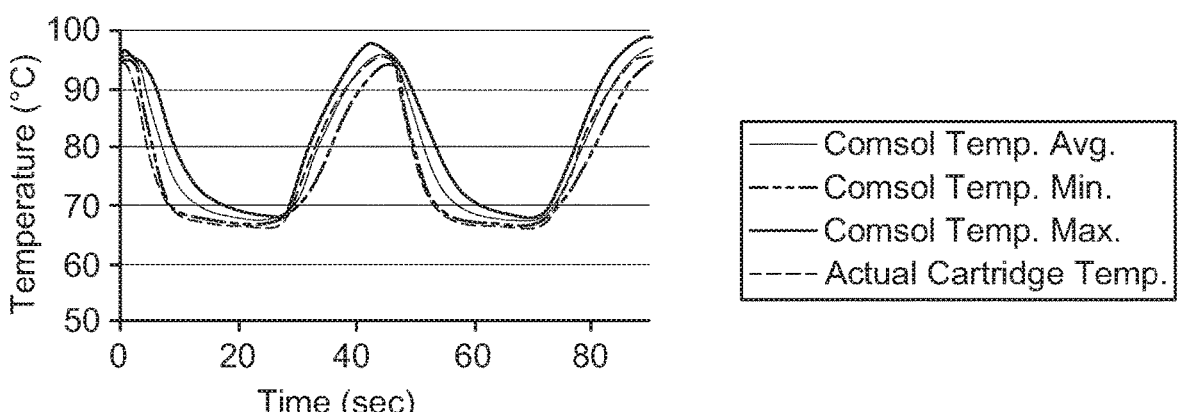
Figure 6C:
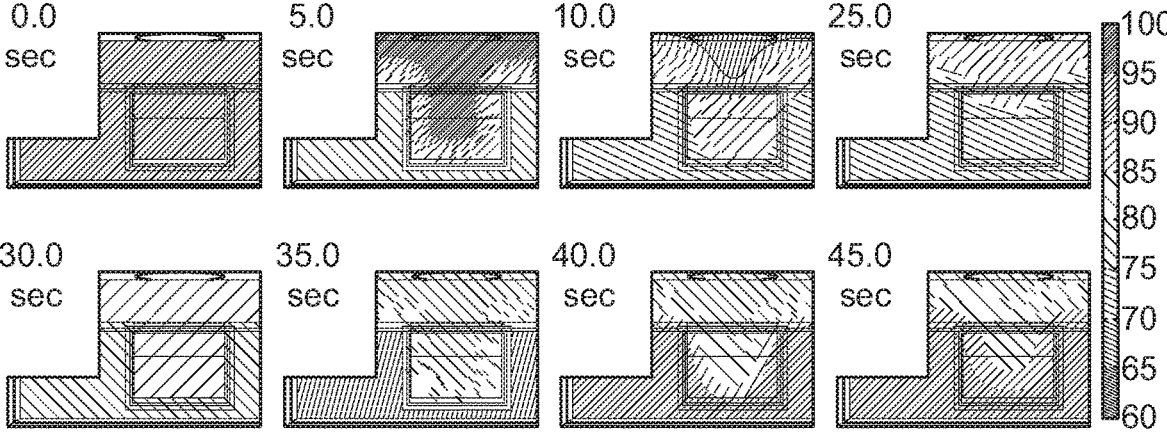

FIGS. 6A-6C are illustrations and heat maps showing PCR Thermal Cycling Characterization according to an the x-axis denotes the temperature detected by a second probe directly embedded inside the PCR well of the cartridge. Measurements were recorded after 30 seconds of maintaining a steady-state temperature for the heat block.

After calibrating cartridge temperature to heat block temperature, thermal cycling for 45 cycles was employed using a PID algorithm to control heating with a 5 second denature and 20 second anneal using 95° C. and 65° C. target temperatures respectively to match temperatures for the HCV assay. The PCR well thermistor measured consistent average temperatures of 95.0±0.5° C. and 66.2±0.1° C. at the end of each cycling step (FIG. 5A). Subsequent temperature ramping from 50° C. to 95° C. over the course of ~3 minutes using the same calibration maintained accuracy to the target temperature within <1° C. (FIG. 5B). The finite-element simulation of the cartridge given the same temperature parameters for thermal cycling closely agreed with the results from the embedded thermistors and validated that a uniform temperature profile was established at the end of both annealing and cooling (FIG. 6A-6C).

Cartridge PCR and Melt Analysis Evaluation

PCR performance on the cartridge was characterized using synthetic human p14(ARF) oligonucleotide targets and primers (Table 1).

TABLE 1

Primer Sequences

| Primer | Sequence | Number of Bases |
|---|---|---|
| p14(ARF) FWD | CGTTTTTGGCGTTGTTTATTTT | 22 |
| p14(ARF) REV | ACATAATACGCAAATTCTTAATAACCCTC | 29 |
| p14(ARF) target | CGTTTTTGGCGTTGTTTATTTTTTCGTGAGTCGCGGG ATGTGAATTACGAAAATTTTTATTCGCGGCGGGTCG TACGCGCGTCGAATTCGGAGGGTTATTAAGAATTTG CGTATTATGT | 119 |
| HCV FWD | GGAGAGCCATAGTGGTCTGCGGAAC | 25 |
| HCV REV | CTCGCAAGCACCCTATCAGGCAGTA | 25 | embodiment of the invention. FIG. 6A is a cross-sectional schematic of the aluminum heat block with inserted PCR well of thermoformed cartridge. Thermally conductive paste was used to ensure complete contact and heat transfer between the heat block and cartridge. FIG. 6B is a comparison of maximum, average, and minimum temperature of the PCR solution tracked during finite-element simulation versus actual temperature measured by a separate thermistor directly within the cartridge well during thermal cycling. FIG. 6C is a series of temperature heat-map snapshots from cross-section of the finite-element simulation. The top row follows cooling from a uniform temperature of 95° C. while the bottom row shows the heating back to 95° C. Uniform temperature distribution within ~1° C. of the target annealing and denaturation temperatures is evident throughout the entire PCR solution delineated by the rectangle at the bottom of the well at the end of each heating and cooling phase.

Figure 7A:
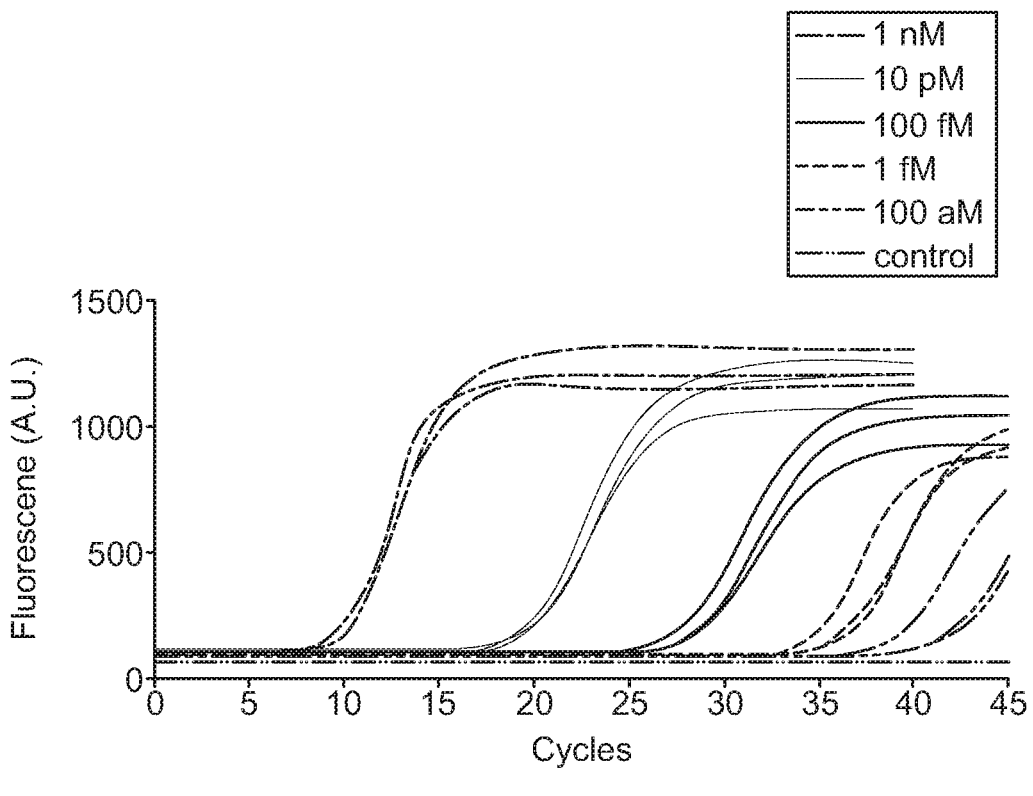
FIGS. 7A-7C are data graphs showing cartridge PCR and melt performance according to an embodiment of the invention.
Figure 7B:
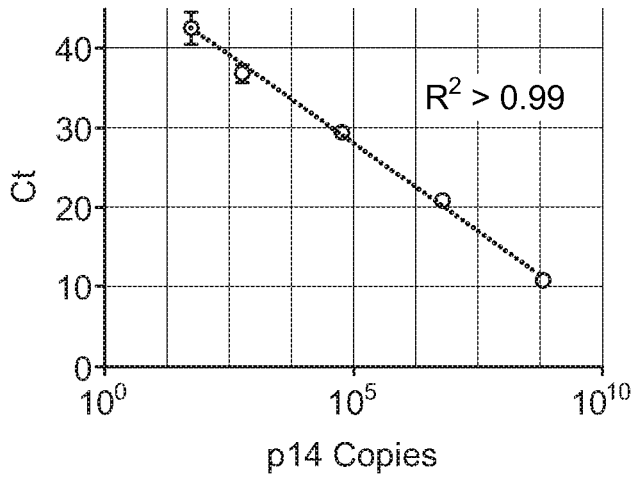
Figure 7C:
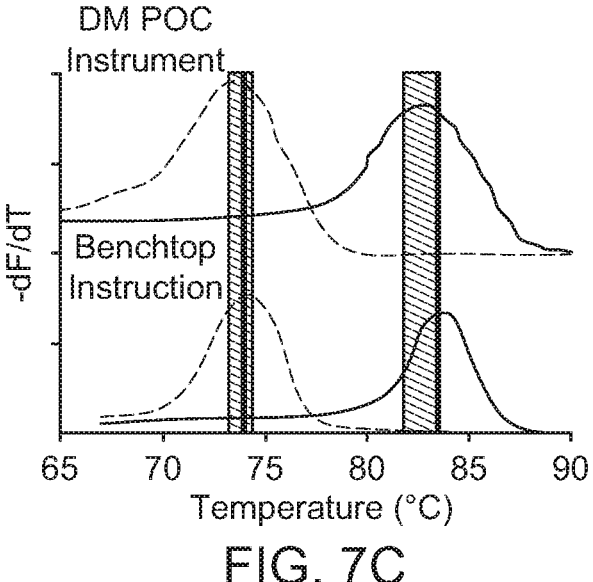
Figure 10A:
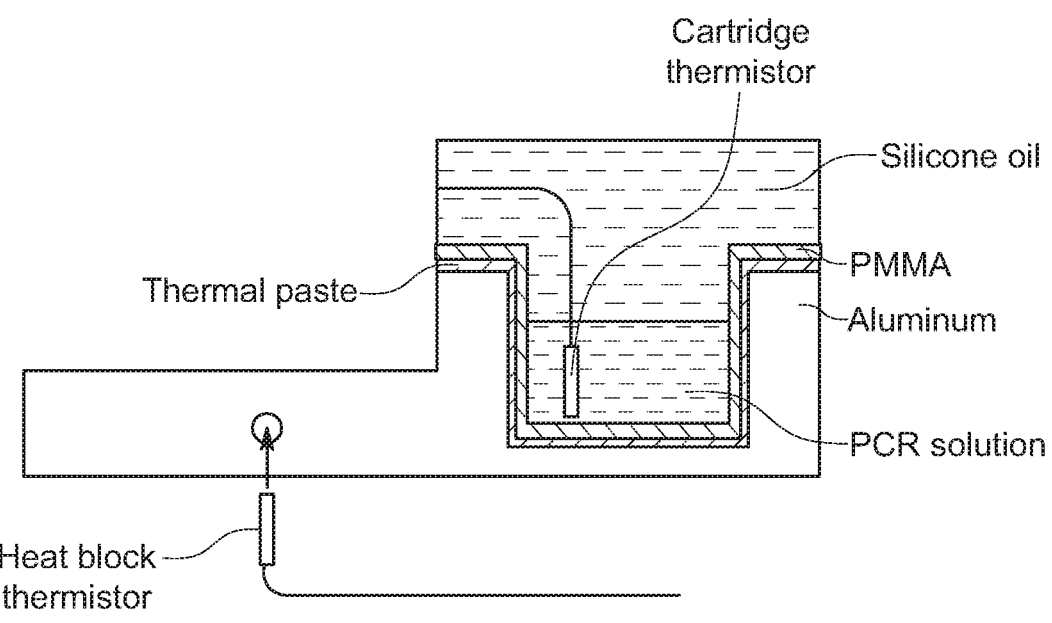
FIGS. 10A and 10B are an illustration of heating block components and heating calibration of a magnetofluidic device according to an embodiment of the invention.
Figure 10B:
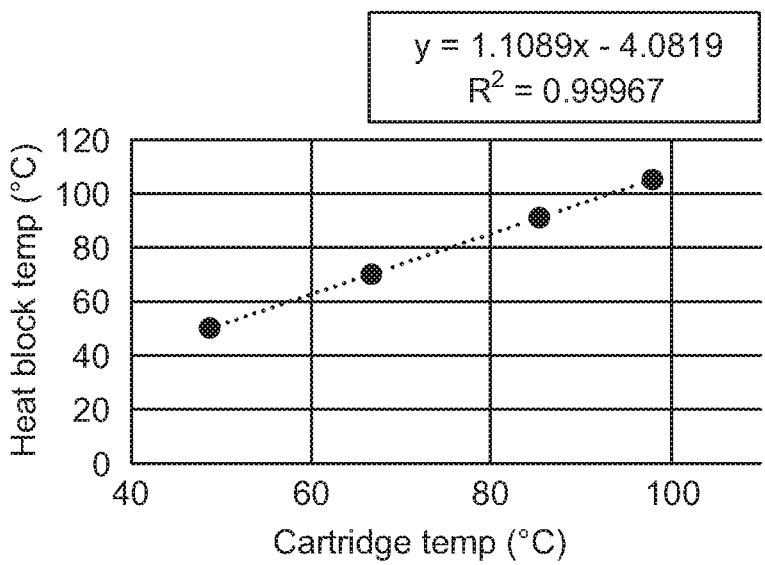

FIGS. 10A and 10B are an illustration of heating block components and heating calibration of a cartridge according to an embodiment of the invention. Temperature control for the PCR solution was calibrated using two thermistor temperature probes. The y-axis denotes temperatures detected by the probe embedded in the aluminum heat block, while The PCR conditions were first evaluated with serial dilutions of target on a standard benchtop thermal cycler before testing PCR with directly spiked targets in the cartridge system. Serial dilutions of p14(ARF) targets were tested in triplicate on the cartridge system with 1 µL target inputs per 10 µL reaction volume with concentrations ranging from 1 nM to 100 aM (FIG. 7A). The p14(ARF) targets were detectable across the full range of concentrations, including at 100 aM corresponding to approximately 60 copies per reaction (FIG. 7B). A strong linear relationship ($R^2 > 0.99$) between algorithmically determined cycle threshold (Ct) and log[p14(ARF) copies] demonstrates consistency in the implementation of PCR thermal cycling on cartridge. Melt temperature analysis on cartridge and benchtop showed close agreement within <1° C. (FIG. 7C). Nonspecific products as a result undesired polymerase activity on oligonucleotide primers in PCR solution were easily differentiable by melt temperature from specific amplicons. This ability to distinguish products by melt peaks provides a method for screening false positives and potential for multiplexed assays that is unavailable with standard protocols for isothermal techniques like LAMP typically investigated for POC instrumentation.[23]

FIGS. 7A-7C are data graphs showing cartridge PCR and melt performance according to an embodiment of the invention. FIG. 7A shows real-time fluorescence of PCR thermal cycling on cartridge using 10 μL PCR solutions directly spiked with dilutions of synthetic p14(ARF) oligonucleotide targets ranging from 1 nM to 100 aM in concentration (n=3 for each dilution). No specific amplification was detected with a negative control (pink). FIG. 7B shows a standard curve generated from the cycle threshold (Ct) values calculated from the PCR in (a). FIG. 7C shows a comparison of p14(ARF) amplicon melt curves generated by the instrument (top) with those generated by a commercial benchtop thermocycler (bottom). The dashed lines indicate the low melt temperature curve of a shorter nonspecific product that is amplified when a PCR solution is left at room temperature for several hours, while the solid lines are melt curves of the desired amplicon products produced when the target is present in the PCR solution. The dark vertical lines represent the benchtop thermal cycler melt temperatures (Tm=74° C. and 83.5° C.) which had a 0.5° C. resolution and were consistent between runs. The broader vertical bars denote one standard deviation from the average melt temperatures detected with the cartridges (Tm=73.8±0.5° C. and 82.7±0.8° C.).

Using the DM-PCR Platform to Process Clinical Specimens

The HCV RNA assay was evaluated using serum samples obtained from two groups of individuals defined using two commercial 'gold standard' HCV assays. The first group was composed of patients with chronic HCV infection in whom HCV RNA was detected by NAAT. The second group contained individuals who had cleared HCV infections as indicated by detection of HCV antibodies in serum, but no detectable HCV RNA by NAAT. We designed a primer pair to enable specific, pan-genotypic amplification of 5′ untranslated region (UTR) in the HCV genomic RNA. Evaluation of the primer set using benchtop processed clinical samples on a standard thermal cycling instrument demonstrated detection down to 12 IU of RNA and successful amplification of genotypes 1a, 2b, and 3a (Table 2). Quantification by Ct yielded close correlation with clinically reported values for HCV RNA quantities ($R^2$=0.97).

TABLE 2

Results of benchtop PCR with HCV positive clinical serum samples

| Patient | Genotype | Viral load (IU/uL) | Serum Volume (uL) | Ct1 | Ct2 | Ct3 | Tm |
|---|---|---|---|---|---|---|---|
| 1 | 1a | 6010 | 1 | 26.07 | 26.09 | 26.08 | 86.5 |
| 2 | 1a | 2440 | 1 | 28.86 | 28.77 | 28.63 | 86.5 |
| 3 | 1a | 1610 | 1 | 29.39 | 29.49 | 29.73 | 86.5 |
| 4 | 1a | 1170 | 1 | 28.12 | 28.22 | 28.17 | 86.5 |
| 5 | 1a | 1100 | 1 | 29.35 | 29.64 | 29.26 | 87 |
| 6 | 1a | 68.2 | 1 | 34.46 | 33.62 | 36.83 | 86.5 |
| 7 | 1a | 45 | 1 | 33.58 | 34.05 | 34.58 | 86.5 |
| 8 | 2a | 14.1 | 1 | 36.16 | 36.63 | N/A | 85.5 |
| 9 | 1a | 12 | 1 | 35.34 | 35.77 | 37.48 | 87 |
| 10 | 3a | 3.16 | 1 | N/A | N/A | N/A | N/A |
| 6 | 1a | 68.2 | 5 | 34.09 | 34.98 | 33.63 | 86.5 |
| 8 | 2b | 14.1 | 5 | 35.7 | 35.78 | 36.98 | 85.5 |
| 10 | 3a | 3.16 | 5 | 37.4 | N/A | N/A | 86.5 |

After evaluation using commercial 'gold standard' HCV assays, each serum sample was tested on the platform by injection into pre-loaded cartridges with magnetic particles and subjected to automated nucleic acid purification, RT-PCR, and melt. Results from PCR assays using injections of 10 μL aliquots from stock and diluted positive serum shows a clear inverse relationship ($R^2$=0.87) between viral load and Ct (FIG. 8A) with an 2.8-3.4 cycle increase compared to the benchtop standard in detection of HCV IU in the range of $10^1$-$10^5$. The limit of detection on cartridges was demonstrated at 45 HCV IU per injection. A standard curve generated from this data provides a method for estimation of viral load within an order of magnitude (FIG. 6B). Negative serum samples displayed no amplification or late amplification of non-specific primer-dimer products as indicated by a lower melt temperature than seen in the positive samples. Melt curve analysis on cartridge measured a melt temperature of 85.9±0.8° C. for positive samples, which corresponds well with the benchtop melt temperature range of 86.5-87.0° C. Similarly, nonspecific amplicons from the primer set produced a melt temperature of 79.9±0.4° C. on the platform compared to 79.5-80° C. melt temperatures on the benchtop instrument.

Figure 8A:
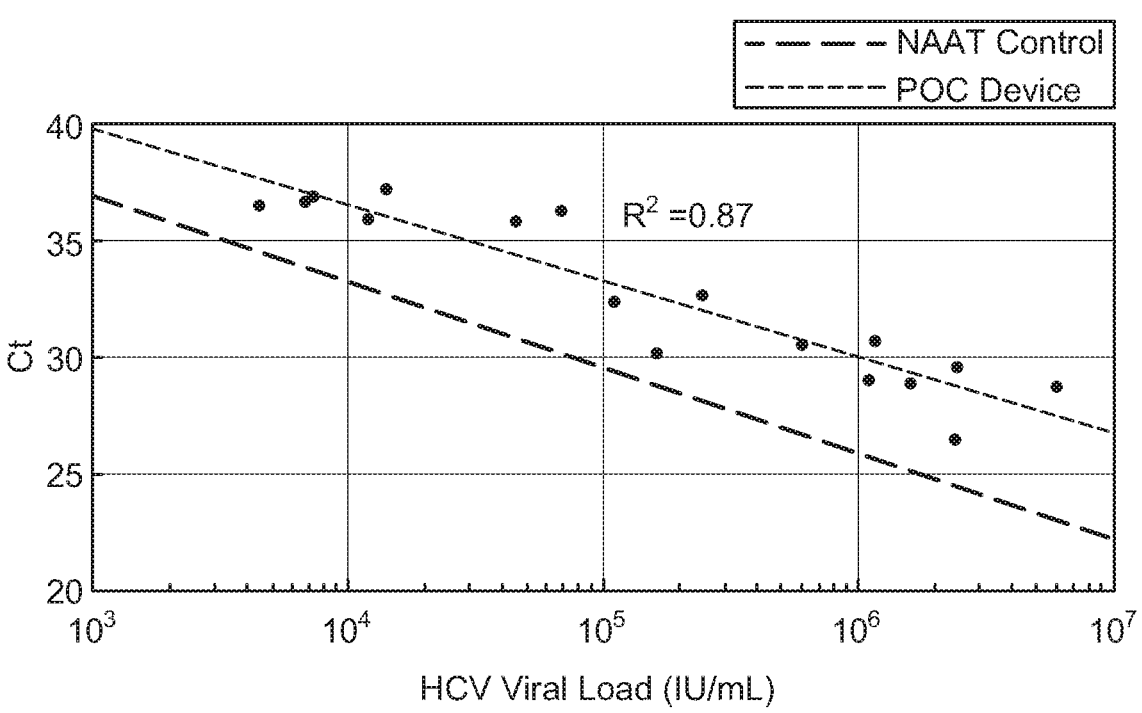
FIGS. 8A and 8B are data graphs showing serum viral load evaluation according to an embodiment of the invention.
Figure 8B:
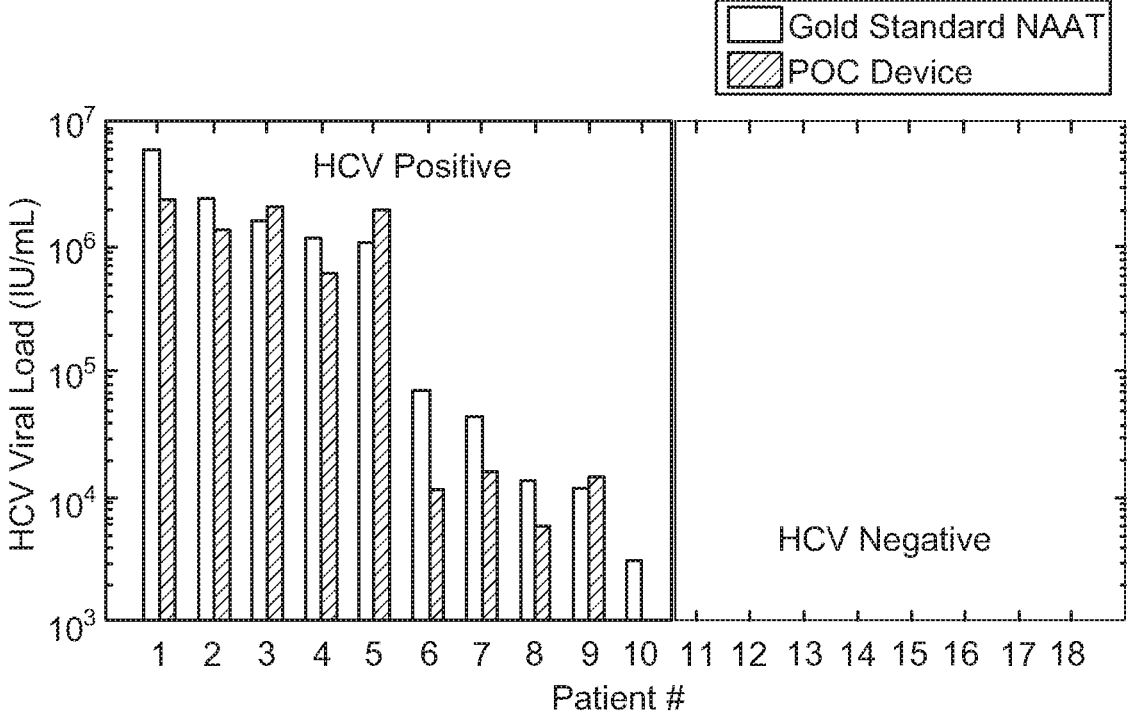

FIGS. 8A and 8B are data graphs showing serum viral load evaluation. FIG. 8A shows a standard curve for threshold cycles versus HCV RNA input generated from cartridge (red) compared to standard curve obtained from NAAT control conducted on a benchtop thermocycler. HCV-infected clinical blood serum samples with dilutions ranging from 1:1 to 1:10 serum to water (n=18) were injected into cartridges in 10 μL aliquots. The limit of detection was found to be approximately 45 IU of HCV RNA. FIG. 8B is a bar graph showing HCV RNA content of 10 μL undiluted serum samples detected on cartridges. Estimates of HCV IU (blue bars) were calculated by substituting Ct values from each cartridge PCR test into the fitted relationship represented by the dotted red line in FIG. 8A. The actual values (gray bars) were based on HCV IU concentrations for each patient reported by clinical laboratory processing. Only patient 10 with the lowest viral load (3160 IU/mL) went undetected out of all positive samples (n=10). No false positives were detected through cartridge processing of the cleared HCV negative patient samples (n=8).

Discussion and Conclusion

DM platforms have previously been limited to isothermal or off-chip thermal cycling due to planar designs that restrict localized and rapid heat transfer. By expanding magnetic manipulation of samples beyond a single plane with a Z-θ magnetic manipulator, integration of sample processing and PCR thermal cycling within a single cartridge was demonstrated. Sequestration of digitized reagent droplets was accomplished with thermoformed acrylic extruded wells and silicone oil as an immiscible transfer medium. Assay operation is simplified to a single injection into a cartridge followed by insertion into the instrument. The ease of operation and highly scalable thermoforming manufacturing process makes this platform suitable for translating PCR NAATs to the POC. Enabling PCR at the POC provides significant advantages to current trends in the development of POC technology toward isothermal amplification NAATs due to higher sensitivity, potential for faster assays, multiplexing capabilities, quantification, and high-resolution melt analysis.

HCV RNA detection is critical for evaluation of a patient's current state of infection and for monitoring treatment success. Whereas precise and sensitive quantification was once necessary to make treatment decisions, now treatment is indicated for all with detectable HCV RNA and considered successful for all for whom no HCV RNA is detected 12 or more weeks after treatment cessation.[24] Indeed, we and others have demonstrated considerable loss of patient retention between visits at which screening and confirmation of infection are done.[25,26] Clearly, one of the major limitations in the overall effectiveness of treatment is the inability to deliver complete care at the point of service. In particular, a lack of direct accessibility to diagnostic instrumentation prevents concurrent evaluation of HCV viral load and clinical consultation within a single visit. Use of the cartridge-based system described above could simplify diagnosis and viral load monitoring to a single visit to reduce attrition due to loss of follow-up as well as the enormous psychological harm that occurs when a patient is told infection is possible but not yet confirmed. Confirmation at the point of care also allows for immediate prescription of treatments to the patient or appropriate adjustments based on disease progression.

Typical HCV RNA levels in blood serum of chronically infected patients occur between $10^5$-$10^7$ IU/mL, and maintain consistent levels between individuals if gone untreated.[27] The instant cartridge has a demonstrated sensitivity of 45 IU per sample, corresponding to approximately 4,500 IU/mL, which adequately meets the threshold needed for diagnosis and identification of significant changes in a patient's viral load. In one analysis of multiple patients enrolling in a clinical trial, 97.2% had viral loads greater than 4,500 IU/ml.[28] Decreases in the viral load of an order of magnitude or more indicates a positive response to treatment. The system has demonstrated viral load estimation from samples with HCV RNA concentrations spanning 5 orders of magnitude with an estimated error <1 log(HCV RNA), proving the device's utility for monitoring HCV treatment efficacy. Based on the observed data, the described cartridge platform has the sensitivity to adequately detect chronic HCV infection from sample volumes of 10 μL or less, which is in a range typically associated with fingerstick tests.

The assay was designed for pan-genotypic amplification of all HCV viral strains with demonstrated success in detection of genotypes 1a, 2b, and 3a. This goal is consistent with the recent development of pan-genotypic treatments. Development of drugs like Vosevi® (Gilead Sciences, Inc.) and Mavyret™ (Abbvie Inc.) provides pan-genotypic treatment options for naïve patients. Nonetheless, genotyping HCV infections remains the standard of care.[29,30] Notably, current commercially available tests such as the VERSANT® HCV genotype 2.0 assay (LiPA) (Siemens Healthcare GmbH®) could be adopted into the cartridge system. Primers could also be designed to produce amplicons with varying melt temperatures based on each genotype. Given a standard deviation <1° C. for cartridge melt temperatures of the genotype 1a clinical samples, designing primers for genotype differentiation would require only a few degrees difference to tell them apart using melt analysis. The fluorescence detector used in the platform also has 2-color excitation and emission functionality, which could be leveraged for multiplexing for genotyping or diagnosis of additional RNA viral diseases like HIV. By brining diagnostics to the POC with the platform, HCV screening could be made more widely available for early detection of HCV before development of liver cirrhosis, enabling use of these pan-genotypic treatments and simplicity of the cartridge assay to the pan-genotypic amplification in this work.

In the tests demonstrated on the cartridges, clinically obtained serum was injected rather than whole blood samples. To extract blood serum from whole blood traditionally requires expensive centrifuges, which presents another roadblock to implementation of assays outside of a typical laboratory environment. Recent advances in POC and lab-on-chip technology have produced simple low-cost methods for blood separation in minutes that use disposable devices leveraging hydrophobic surfaces or hand-powered centrifugation.[31,32] Another barrier to realistic implementation of the cartridges is long-term storage of PCR reagents. Enzymes involved in NAATs are sensitive to degradation and will produce non-specific products if primers are present leading to potentially false-positive results. To circumvent this storage issue, lyophilization of PCR solutions and encapsulation in wax for release upon heating is one successfully demonstrated technique that could easily be adopted into the cartridges.[33-35] All other necessary components besides the PCR solution (binding buffer, wash buffers, magnetic particles) are stable at room temperature for convenient cartridge storage. Pairing the platform with novel methods for plasma separation and reagent storage would remove the need for laboratory entirely, enabling complete sample processing and clinical answer in the same room as the patient.

The potential uses for the magnetofluidic POC PCR platform extend well beyond testing for HCV. The multi-well design of the cartridges allows for carrying out a variety of other assays involving the capture and transport of nucleic acids. In particular, the DNA methylation characteristics of certain genes show promise for use in early cancer detection. Assessment of methylation levels of DNA through bisulfite conversion on magnetic particles has been previously demonstrated in a magnetofluidic system, but required manual extraction of eluted product for PCR on a benchtop system.[36] Using the paradigm of the extruded well cartridge design, the complete procedure for analysis of DNA methylation levels from cell lysis to NAAT could be completely integrated. Outside of healthcare, POC-PCR with magnetofluidics could expedite analysis of crops and livestock in agricultural settings for on-site detection of bacterial contamination or genotyping for identification of genetically-modified strains.[37-39]

Materials and Methods

Design and Fabrication of Portable PCR Instrument

The instrument utilizes an Arduino microcontroller (Arduino Uno R3) with two stackable custom printed-circuit boards (PCB) for connection and communication with all electronic components. The Z-θ manipulator was built by coupling the base of a PQ12-R linear servo (Actuonix, Victoria, BC, Canada) to the rotary shaft of HS-485HB rotary servo (Hitec RCD, Poway, CA, USA) using a custom-designed coupler. All custom mechanical components were designed using a computer-assisted drawing (CAD) software (Soldiworks 2015, Dassault Systemes SOLID-WORKS, Waltham, MA, USA) and built using a desktop 3D printer (Formlabs Inc., Somerville, MA, USA).

The heating module consisted of five components as shown in FIG. 3B: an aluminum heating block, a thermoelectric (TE) module, a temperature probe, a heatsink and a fan. The heating block contained a machined well to mate with the cartridge and was designed to maximize contact with the TE module while minimizing thermal mass and vertical profile to enable unimpeded access to the PCR well by the Z-θ manipulator. The TE module was purchased from Custom Thermoelectric (Bishopville, MD). A temperature probe was built using a 14 kΩ NTC thermistor (Semitec USA, Torrance, CA) in a Wheatstone bridge configuration. The thermistor head was embedded into the heating block to monitor temperature. The heatsink and fan were used to dissipate heat on the TE module during the cooling phases of thermal cycling. A PID algorithm was used to control current to the TE module to adjust and maintain temperature based on readings from the thermistor probe.

PCR and Melt Fluorescence Data Analysis

A software control interface was programmed using the open-source Processing IDE. In brief, the control interface utilized serial communication to the Arduino microcontroller to send instructions to the optical, thermal and mechanical modules. Data acquired from optical and thermal modules was sent back to the control interface. Data analysis was carried out with a custom MATLAB script. Fluorescence peak values from each cycle were isolated and fit to a logistic regression curve for Ct determination by the second derivative maximum.[40] Melt temperatures were determined by smoothing the fluorescence signal versus temperature using a Savitzky-Golay filter. The negative first-order derivative (−dF/dT) was calculated for the resulting curve and the peaks were identified as the melt temperature.

Design and Fabrication of Thermoplastic Cartridge Body

The cartridge consists of two functional layers separated by a spacer. The bottom layer consists of extrusions designed to hold assay reagents while providing adequate thermal contact for the PCR reagent. The top layer consists of an inlet for pipette-loaded injection of sample into cartridge, in addition to a smooth PTFE surface to facilitate magnetic particle transport between reagents. Each cartridge component was first designed using CAD software and later developed into either a laser-cutting template or a vacuum mold as appropriate for prototyping.

Figure 11:
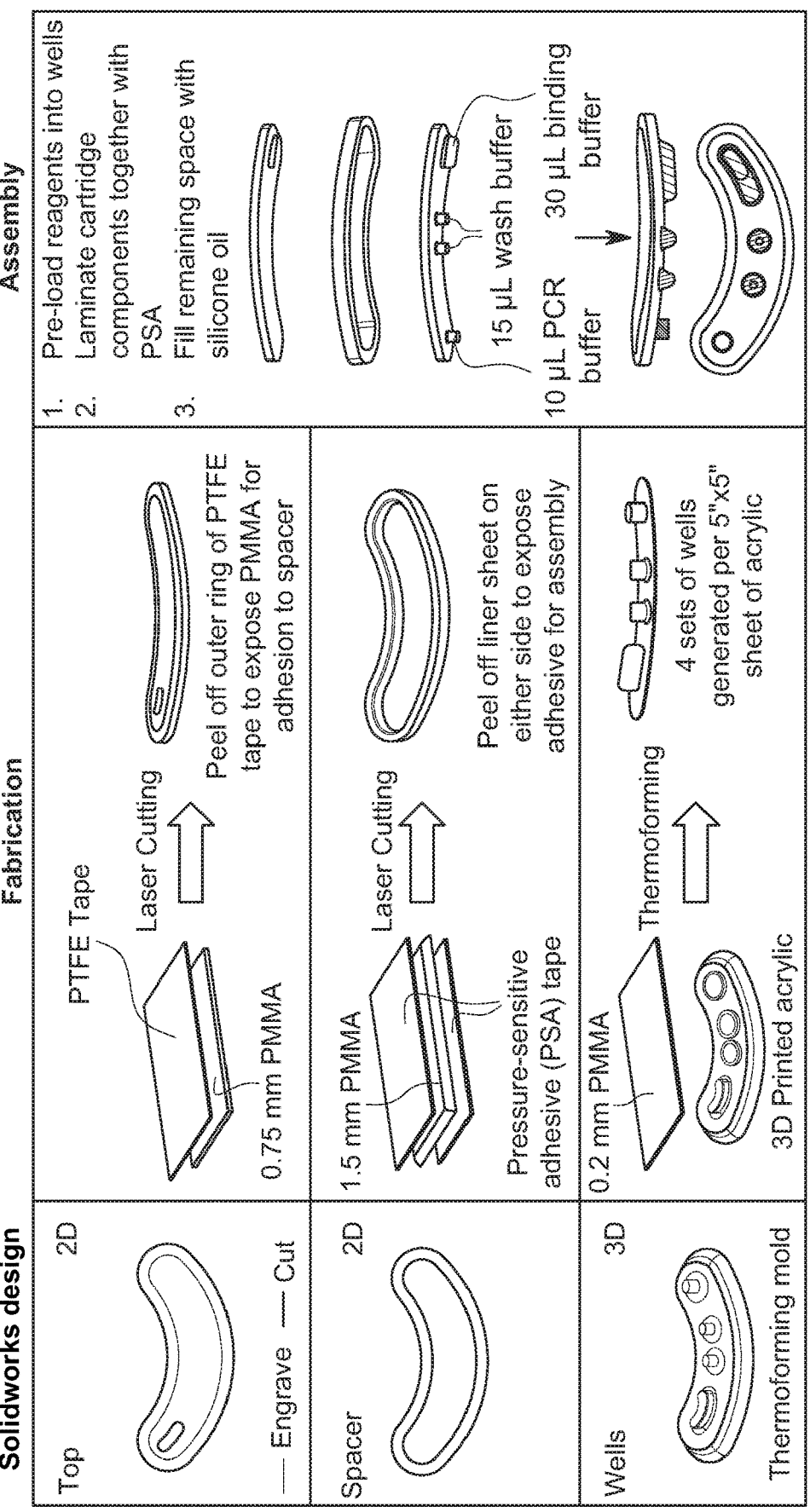
FIG. 11 is a schematic showing assembly of a magnetofluidic cartridge according to an embodiment of the invention.

The cartridge is built using a combination of laser-cutting and thermoforming as shown in FIG. 11. First, a thin (0.2 mm) PMMA film is thermoformed into a multi-well bottom layer using a commercial dental vacuum forming instrument (Meta Dental Corp, Glendale, NY). Afterwards, a thicker (0.75 mm) PMMA sheet is laminated on one surface with PTFE tape and engraved or cut using a CO2 laser cutter (Universal Laser Systems, Inc., Scottsdale, AZ) to generate the top layer. The spacer frame is generated in an analogous manner using a thick (1.5 mm) PMMA sheet laminated on both sides with a pressure-sensitive adhesive (468MP, 3M, Maplewood, MN). Components were rinsed with isopropyl alcohol and deionized water, loaded with reagents and assembled via lamination prior to use.

Cartridge Reagent Preparation and Loading

Prior to lamination of the cartridge, the PMMA surface of the wells was passivated with incubation in silicone oil at room temperature for >1 hr. The passivating silicone oil was aspirated immediately before loading the aqueous reagents into each well. The largest well opposite the loading port was loaded with 30 µL binding buffer, the two central wells were loaded with 15 µL wash buffer, and the final well was loaded with 10 µL of the PCR buffer. Single well cartridges designed for directly spiked calibration of PCR contained just the PCR well in the same dimensions as the full cartridge. Magnetic particles, binding buffer, and wash buffer solutions were obtained from a magnetic DNA purification kit (Chargeswitch™ gDNA Mini Bacteria Kit, ThermoFisher Scientific, Walton, MA). A commercial qRT-PCR master mix was used according to the concentrations recommended by the manufacturer for amplification and detection of RNA samples (SensiFast SYBR No-ROX kit, Bioline USA, Taunton, MA). Tween 20 was added as a surfactant to all pre-loaded aqueous reagents for a final concentration of 0.2% to reduce surface tension between the silicone oil and reagent interface for facile magnetic particle transport. After loading the reagents, all cartridge components were laminated and the remaining space within the cartridges was filled with silicone oil (100 cSt, Millipore Sigma, USA). Assembled cartridges were kept on ice before sample injection and processing on the instrument.

Cartridge Temperature Control Characterization and Calibration

A standalone thermistor temperature probe was built using the same design as the probe utilized in the thermal control module of the DM-PCR instrument. This second probe was embedded directly in the PCR well of a calibration cartridge containing 10 µL of water as a surrogate for PCR solution with the remainder of the cartridge filled with silicone oil. The temperature of the heating module was set and held at four different temperatures between 50-105° C. for 30 seconds to obtain a steady state temperature within the PCR well. The linear relationship ($R^2 > 0.99$) between the cartridge temperature and heating module was used to calibrate temperature conversions from the desired cartridge temperatures programmed in the graphic user interface to the PID set heating module target temperatures. The same setup with embedded cartridge temperature probe was used to evaluate the accuracy of the calibration for the PCR solution temperature during both thermal cycling (45 cycles, 65-95° C.) and melt (50-95° C. at ~0.3° C./s) as shown in FIGS. 5A and 5B.

To ensure the sampling of the embedded probe accurately represented the entirety of the PCR solution during thermal cycling, the heat transfer from the aluminum heat block through the cartridge into the PCR solution was simulated using a 3-dimensional finite element model (COMSOL Multiphysics, Burlington, MA, USA). A 2-dimensional cross-section of the center of the heat block and cartridge assembly is shown in FIGS. 6A-6C. Temperature data from the heat block probe during thermal cycling over three cycles on the instrument was fed into the simulation to set the temperature of the heat block in silico. Temperature of the solution, heating block, and cartridge was initialized for the simulation at 95° C. to represent the end state of the hot-start 2-minute hold at 95° C. prior to cycling. The resulting maximum, average, and minimum temperature of the 10 µL aqueous PCR solution modeled within the well from the simulation was compared to results of the thermal cycling temperature measured by the embedded probe (FIG. 6B) with sufficient agreement to conclude the PCR solution achieved uniform heating and cooling for consistent assay conditions.

Automated Magnetofluidic Sample Purification Routine

Sample purification was implemented through pre-programmed motion of opposing permanent magnets around the cartridge by actuation of the Z-θ manipulator. By lowering the top magnet (magnet$^T$) onto the top surface of the cartridge by extending the linear servo arm of the Z-θ manipulator, the magnetic particles were concentrated into a plug and extracted from the reagent wells onto the silicone oil on the flat inner surface of the cartridge. Subsequent rotation of the rotary servo provided transfer between wells. Retracting the linear servo arm removed magnet$^T$ from the cartridge and raised the bottom magnet (magnet$^B$) up towards the wells for attracting the magnetic particle plug into the reagent wells. The low-profile aluminum heat block covering the PCR well was designed thin enough to allow close proximity of magnet$^B$ with minimal attenuation of the magnetic field.

The routine for sample purification was as follows. After injecting a sample containing nucleic acids mixed with magnetic particles and binding buffer into a cartridge, magnet$^B$ was raised to condense the magnetic particles into a tight plug. Next, magnet$^T$ was actuated to the top of the cartridge and rotated above the first wash buffer followed by attraction into the wash buffer with magnet$^B$. Washing the magnetic particles of excess serum debris was accomplished by repeated extraction out of the wash buffer with magnet$^T$ and attraction back into the well with magnet$^B$. This wash process was repeated with transfer into the second wash buffer well. After washing, the particle plug was transferred into the PCR solution and the magnets were moved into a neutral position for 2 minutes to allow for passive elution of the nucleic acids into the solution. The particles were extracted and rotated away from the PCR well prior to NAAT implementation to prevent inhibition of enzymatic activity and allow a clear path for the fluorescence signal.

p14(ARF) Cartridge qPCR and Particle Transfer Evaluation

The ability to conduct a quantitative PCR (qPCR) assay with the cartridge platform was confirmed by directly spiking serial dilutions of synthetic p14(ARF) oligonucleotide targets into PCR solutions with previously validated primers.[41] The PCR solution contained 50 mM Tris-Cl pH 9.2, 16 mM amonium sulfate, 0.05% Brij 58, 3.5 mM magnesium chloride, 0.3 μM of each forward and reverse primer, 200 μM of each deoxynucleotide triphosphate (dNTP), 1 μM EvaGreen dye, and 0.1 μM Klentaq1 DNA polymerase (DNA Polymerase Technology, St. Louis, MO, USA). Target oligonucleotides dilutions with concentrations between 1 nM and 100 aM were spiked into the PCR master mix such that the 10 μL PCR aliquot in each cartridge contained 1 μL of the target solution. Cycling conditions on the instrument were 95° C. for 2 min followed by 45 cycles of 95° C. for 5 seconds and 62° C. for 20 seconds followed by melt from 50° C. to 95° C. at ~3° C./second. The annealing temperature was chosen given the optimized conditions of the past study using this primer set and cycling was halted at 40 cycles for input target concentrations greater than 10 pM due to early saturation of fluorescence.

HCV Primer Design and qRT-PCR

Consensus sequence was identified by aligning the 5' untranslated region (5'UTR) sequences from reference genomes of all known HCV genotypes obtained from an online HCV sequence database (Los Alamos National Laboratory, Los Alamos, NM). Several candidate primers were subsequently designed based on melting temperature ($T_m$). After checking for specificity using Primer-BLAST (National Center for Biotechnology Information, Bethesda, MD) and self-complementarity using Multiple Primer Analyzer (ThermoFisher Scientific, Waltham, MA), the primers were evaluated via qRT-PCR using synthetic HCV 5'UTR RNA standards (Asuragen, Austin, TX). The primer set chosen for implementation on the cartridge was verified on a benchtop instrument for robust amplification of samples spiked with both the synthetic HCV standard (genotype 2b) and all HCV-positive serum samples (genotypes 1a, 2b, 3a). Non-specific amplicon products were typically not present after PCR, or amplified in very late stages of thermal cycling with a distinct melt temperature from the specific product.

Clinical Sample Testing

Archived and identified serum samples from a prior study were obtained from the Johns Hopkins School of Medicine and stored at −80° C. when not in use. Serum samples represent two groups of individuals with a history of HCV infection, with the first group having an ongoing HCV infection with a NAAT-detectable viral load, and the second group having been cleared of HCV with no detectable level of HCV RNA. The group with detectable HCV RNA was also tagged with a quantified viral load obtained from a conventional NAAT assay. To conduct a cartridge assay, 10 μL of blood serum at varying dilutions with water was pipette mixed with 4 μL aqueous magnetic particle solution (25 mg/mL in 10 mM MES, 10 mM NaCl, 0.1% Tween 20) and 0.5 μL of carrier RNA (Ambion® Carrier RNA, ThermoFisher, USA) before injection into the binding buffer through the cartridge port followed by mounting the cartridge within the device. Assay protocol on the DM-PCR instrument consisted of four consecutive steps: 1) droplet magnetofluidic processing, followed by 2) 45° C. incubation for 10 minutes, followed by 3) 45 cycles of thermal cycling (95° C. denature for 5 seconds, 65° C. annealing for 20 seconds) and 4) melt curve analysis (positive thermal ramp from 60° C. to 95° C. at a rate of 0.1° C./s).

Example 2

Figure 12A:
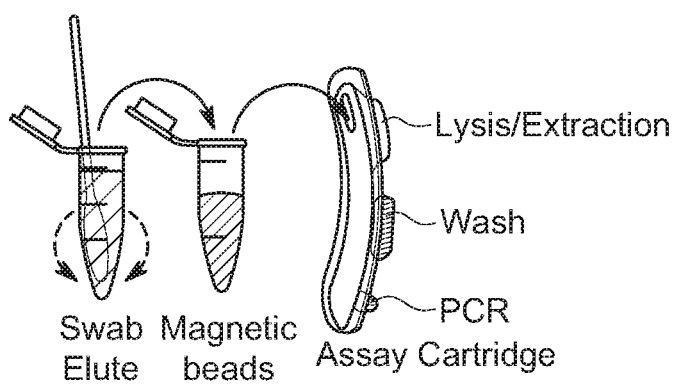
FIGS. 12A-12F are a series of illustrations, schematics, and data graphs showing a magnetofluidic device according to an embodiment of the invention.
Figure 12B:
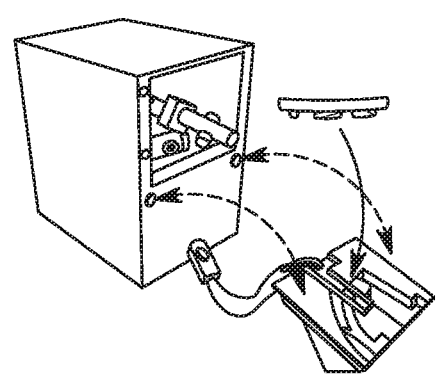
Figure 12C:
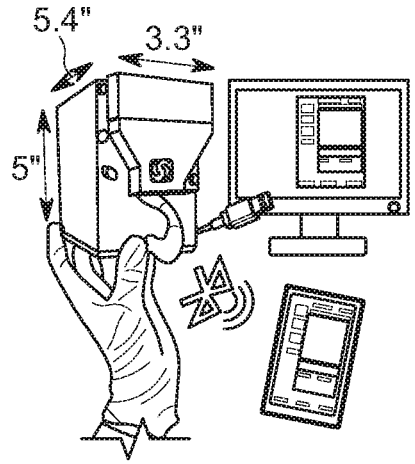
Figure 12D:
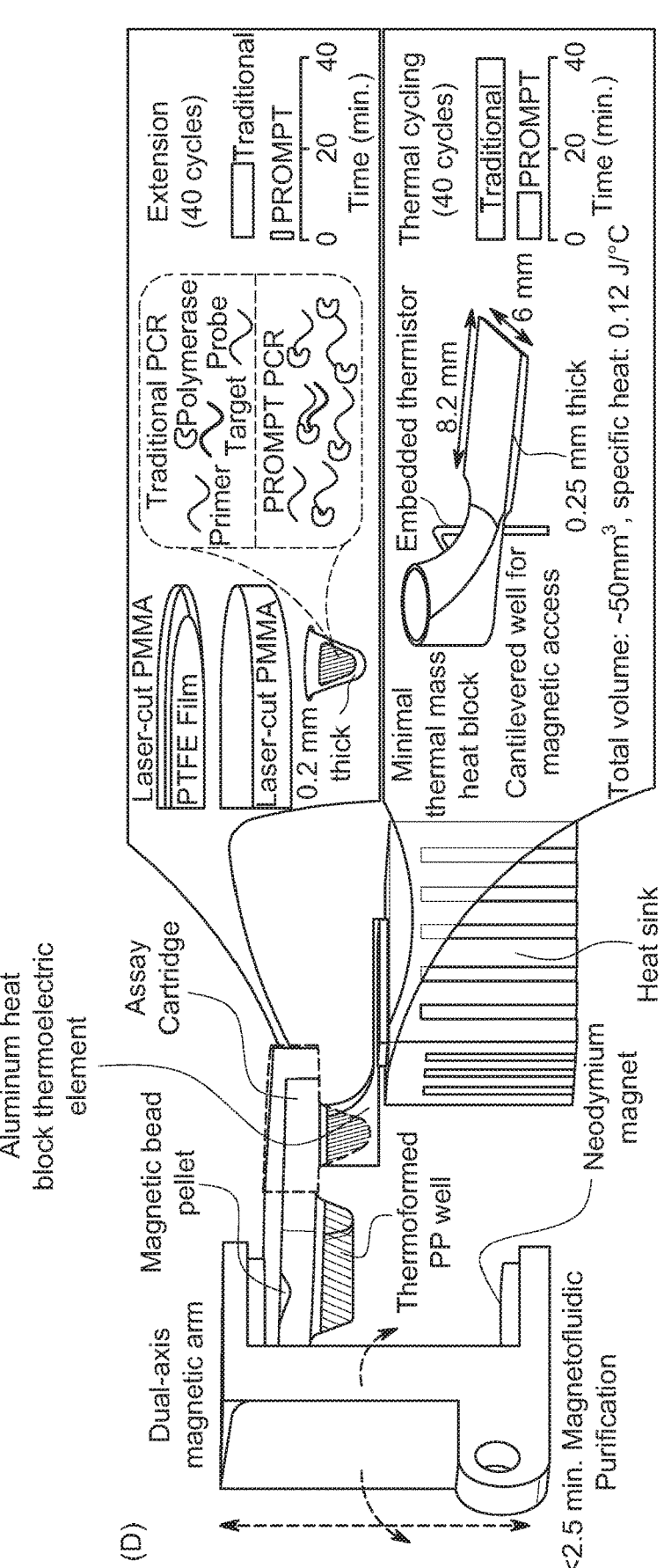
Figure 12E:
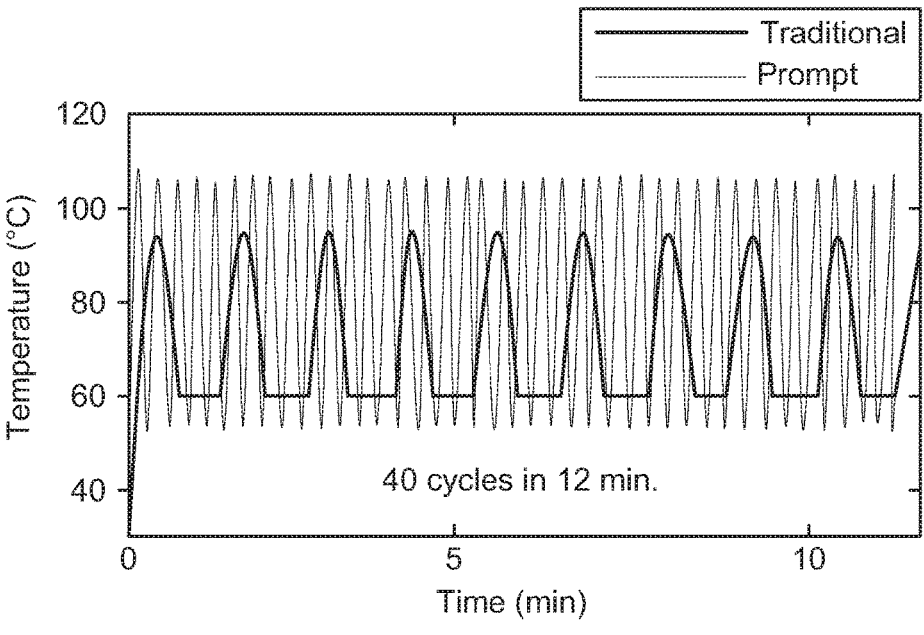

Platform for Rapid On-Cartridge Magnetofluidic Purification and Testing (PROMPT) Platform Operation The PROMPT platform streamlines the workflow for *Neisseria gonorrhoeae* (NG) diagnosis to two manual injections—one to mix eluent from a genital swab with a functionalized magnetic bead solution, and another to inject the combined solution into an assay cartridge (FIGS. 12A-12F). The cartridge is mounted onto the instrument which provides alignment to magnetofluidic processing and fluorescence detection through magnetic clasping (FIG. 12B). The user initiates an assay through a USB-connected computer graphic user interface (GUI) or to a smartphone device application through wireless Bluetooth communication (FIG. 12C). Automated magnetic manipulation of beads through cartridge reagent droplets by actuation of permanent magnets on a dual-axis arm facilitates pH-dependent electrostatic nucleic acid capture, purification, and elution for on-cartridge PCR amplification. The PCR assay multiplexes testing for NG detection and susceptibility to ciprofloxacin by targeting the opa and gyrA genes respectively (FIG. 12D). An opa-positive result indicates the presence of NG, while a subsequent gyrA-positive indicates ciprofloxacin susceptibility. Sample preparation within the cartridge completes within 2.5 minutes and approximately 12 minutes is needed for 40 cycles of PCR resulting in a <15-minute turnaround time (TAT) (FIGS. 12D and 12E). Analysis of fluorescent signals by an integrated 2-color confocal detector in real-time allows diagnostic reporting the moment amplification is evident for even faster diagnosis (as low as 10-minute TAT for high bacterial load samples).

Figure 12F:
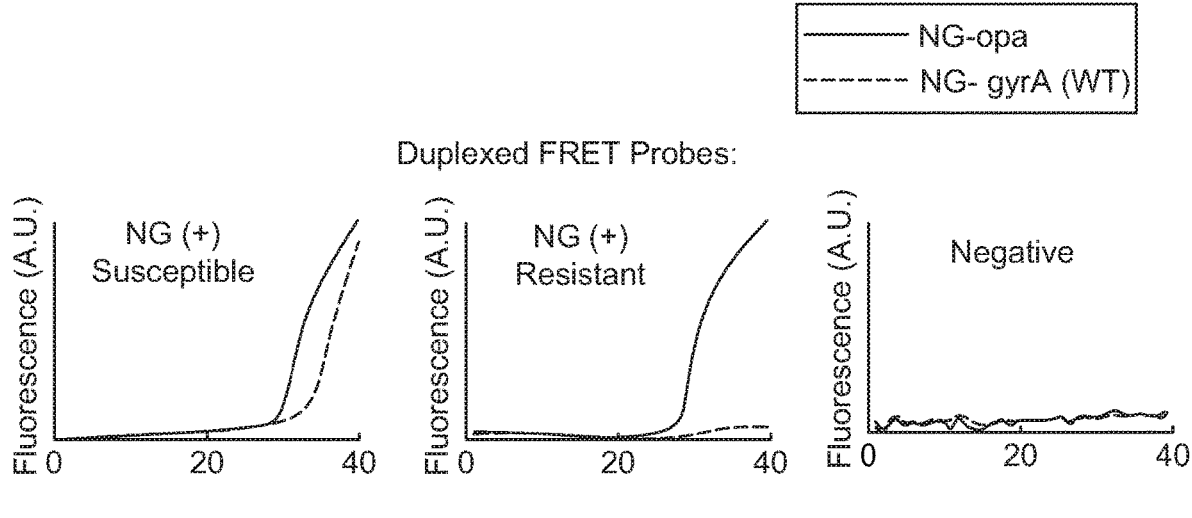

FIGS. 12A-12F are a series of illustrations, schematics, and data graphs showing a magnetofluidic device according to an embodiment of the invention. FIG. 12A is a schematic showing that swab samples are first eluted into PBS followed by mixing an aliquot of the elute with a magnetic bead solution that serves to lyse NG cells and bind nucleic acids. The magnetic bead mixture is injected through a port into the first well of an assay cartridge. FIG. 12B is an illustration showing the cartridge is loaded into the PROMPT instrument for magnetofluidic purification with transfer of the magnetic beads through wash buffer followed by direct elution into the PCR well for thermocycling and detection. FIG. 12C is a schematic showing how the instrument interfaces with either a desktop computer through a USB connection or to an android smartphone or tablet by Bluetooth for assay control and data collection. FIG. 12D is an illustration showing a dual-axis arm with opposing neodymium permanent magnets rotates, extends, and retracts to guide magnetic bead transfer between the thermoformed polypropylene (PP) wells of the assay cartridge. The PCR well of the cartridge mounts directly into an aluminum heat block directly attached to a thermoelectric element and heatsink. Within the PCR well, elevated concentrations of primer, probe, and enzyme enhance assay kinetics allowing for use of <1 sec/cycle extension times. To speed up the ramp rates for thermal cycling, the heat block was designed for minimal thermal mass while maintaining full contact with the thermoelectric element and a cantilevered well to allow close proximity of magnetic actuation to transfer beads into the well. Temperature ramping between 60 to 95° C. for 40 cycles using requires <11 min for a total PCR time of ~12 min (see FIG. 12E) while a traditional PCR thermo-cycler can only complete <10 cycles in the same timeframe. FIG. 12F shows live-reporting of 2-color on-cartridge fluorescence allows for NG detection and determination of antimicrobial susceptibility.

Design of Low-Power Rapid Cartridge PCR

The instrument and cartridge were designed in parallel for automated sample-to-answer functionality from patient swabs with maximal PCR thermocycling speed. Engineering constraints for use at the POC included maintaining a small instrument footprint, minimal power consumption, clinically relevant assay sensitivity, and a low cost per test. The resulting instrument is contained within 3D-printed housing small enough to fit in a backpack (5"×5.4"×3") and can be easily held with one hand. For realistic portable instrumentation, we limited the power requirements of the instrument to permit use of standard mobile phone chargers (5V, ~2 A) as a power supply. Given that magnetic actuation is conducted with low-power hobby servo motors (40 mA max current draw) and the maximum 2 A current draw only occurs during the ~12-minute PCR on the instrument, a 10,000 mAh phone charger can supply enough power for up to 25 tests.

Based on the power limitations for portable application, a thermoelectric element within the appropriate power specifications with the highest heat flux (~11 W/cm$^2$) and minimal footprint (6 mm×8.2 mm) was selected to control thermocycling. Rapid PCR with low-power constraints is achieved through a combination of optimizing thermodynamics of heating and enhanced assay kinetics (FIG. 12D). The device must be capable of both fast temperature ramp rates and possess adequate enzymatic processivity to amplify targets with minimal extension times at the target temperatures.

In the PCR reaction, kinetics are a function of enzyme processivity, diffusional interactions of enzyme, primers and probes to the target sequence, and target binding strength and specificity. The chosen polymerase in the assay has a high processivity of 10 sec/kb. For replicating the 90 bp sequence of the opa gene under optimal conditions this equates to a 0.9 sec extension time. However, at standard concentrations of primers (~300 nM) and enzymes (~0.25 units per 10 μL) the efficiency of the PCR amplification is limited by diffusion of the reagents and rate of primer-target-enzyme binding events (see FIG. 13B). By increasing the primer and enzyme concentration 7-fold and 4-fold respectively (2 μM primer, 1 U per 10 μL enzyme) the efficiency of the assay can be maximized with just 1 sec holds at the extension temperature (FIG. 13B). With increased enzyme there is a risk of amplifying nonspecific products indicated by aberrant peaks in the fluorescent melt curves (FIG. 13C), though at higher thermocycling rates on the cartridge only specific amplicons are generated.

Figure 13A:
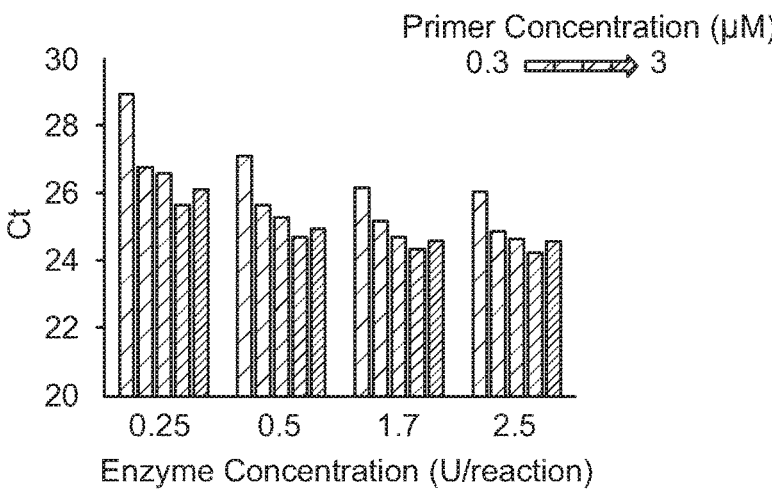
FIGS. 13A-13C are data graphs showing rapid PCR assay optimization of a magnetofluidic device according to an embodiment of the invention.
Figure 13B:
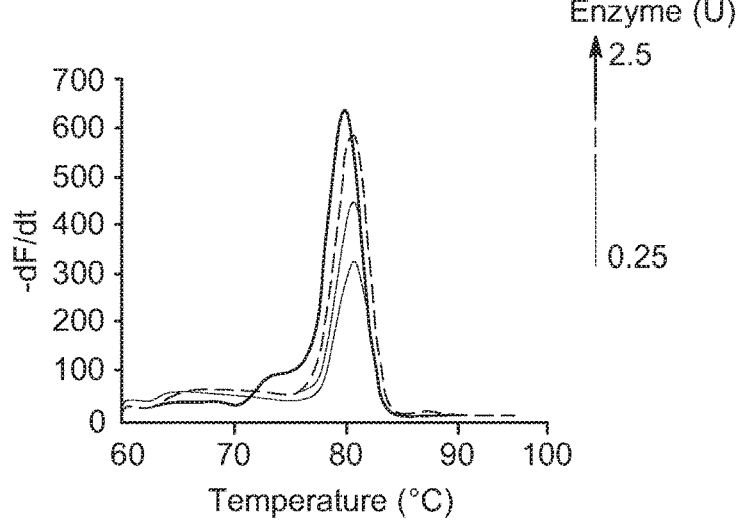
Figure 13C:
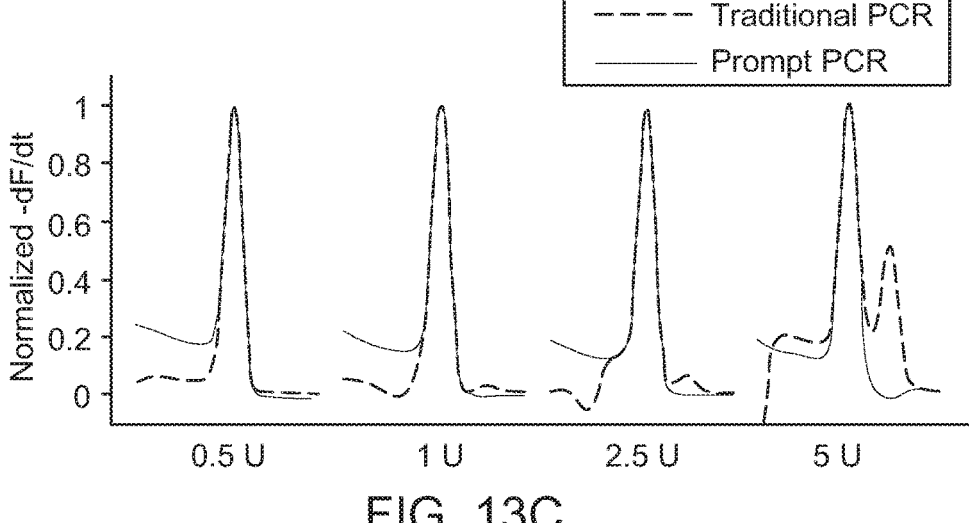

FIGS. 13A-13C are data graphs showing rapid PCR assay optimization according to an embodiment of the invention. In FIG. 13A, PCR reactions with titrations of varying polymerase enzyme and primer concentrations reveal earliest cycle thresholds (Ct) reached with 2 μM primer at the enzyme concentrations greater than 0.5 U/reaction. FIG. 13B shows increasing enzyme concentration increases the final amplicon quantity, as shown by the increasing melt curve analysis peaks, but at higher concentrations, i.e. 2.5 U per reaction, there is a greater likelihood of nonspecific amplification evidenced by the additional curvature next to the specific melt peak at ~80° C. FIG. 13C shows faster thermal cycling in PROMPT PCR cartridges (green) reduces nonspecific amplicons produced with traditional PCR cycling settings (black).

The extruded well geometry improves upon thermal control capabilities of traditional planar microfluidic chips by targeting heating to isolated topography, effectively reducing the thermal mass that is heated and increasing the surface area for focused heat delivery to only the reaction volume. Further minimization in the cartridge PCR system is limited by the need for maintaining compatibility with magnetofluidic chemistry and geometries for bead transfer. The high surface area of too large a volume of magnetic beads with insufficient PCR volume can inhibit nucleic acid elution with excess carryover of neutral pH wash buffers or reduce sensitivity of the assay by extraction of PCR enzyme during removal of the beads. Conversely, too small a volume of beads will not capture nucleic acids efficiently and may lack the magnetic moment to provide sufficient force to cross the oil-water interfaces for reagent transfer within the cartridge. For these reasons, the cartridge and heating apparatus were designed for a 10 μL PCR reaction volume which has been previously established for robust performance when coupled with direct elution magnetofluidics.

Figure 14A:
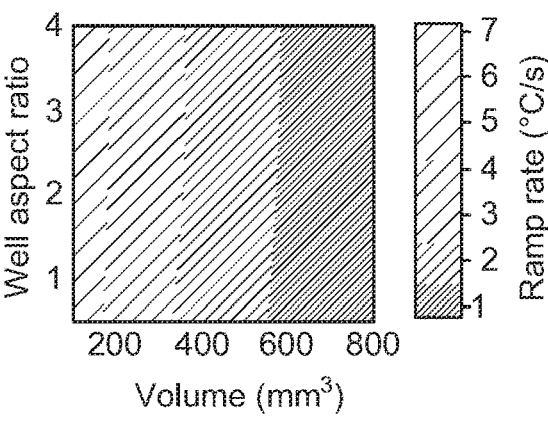
FIGS. 14A-14C are data graphs showing finite-element heat transfer simulations for aluminum heat block design of a magnetofluidic device according to an embodiment of the invention.
Figure 14B:
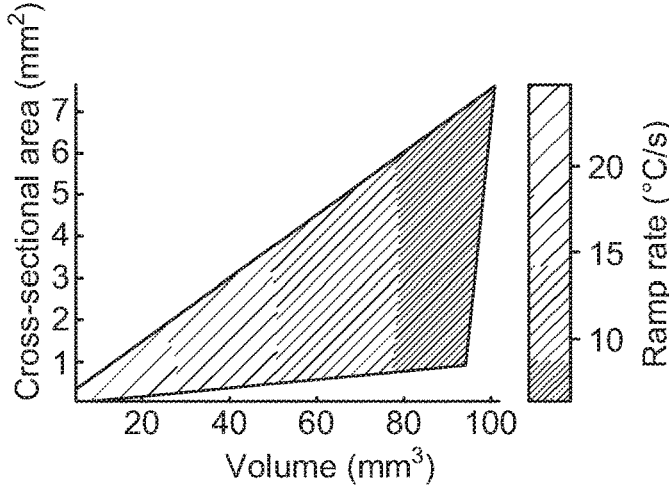
Figure 14C:
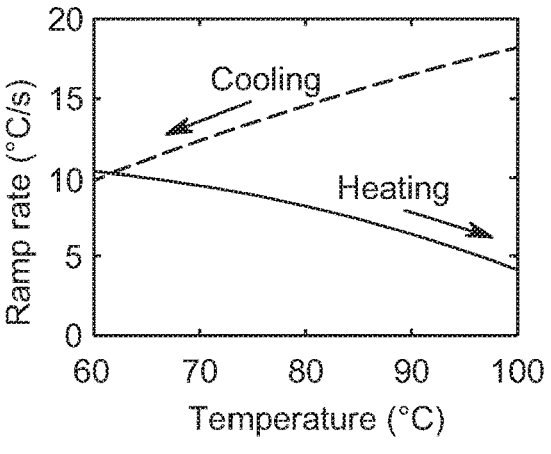

FIGS. 14A-14C are data graphs showing finite-element heat transfer simulations for aluminum heat block design according to an embodiment of the invention. FIG. 14A is a graph showing well aspect ratio (height/width) has minimal effect on the heating ramp rate of the PCR solution. FIG. 14B is a graph showing the thermal conductivity of aluminum is large enough that at the millimeter scales of the heat block a 10-fold decrease the cross-sectional area of the heat block connecting the thermoelectric to the cantilevered well results in a <10% decrease in the PCR ramp rate. FIG. 14C is a graph showing actual PROMPT heat block heating and cooling ramp rates measured during cycling.

The remaining tunable physical parameters include the size and geometry of the heat block used to transfer heat from the thermoelectric to the cartridge, the shape of the well within the heat block, and the thickness and material used in the cartridge. Finite element heat transfer simulations demonstrated that minimizing the thermal mass of the heat block is the most critical factor in the temperature ramp rate (FIGS. 14A and 14B). Importantly, these simulations also demonstrate that when using aluminum as the heat block material at this scale the thermal conductivity is sufficient to rapidly heat the entire block and cartridge contents between 25 to 100° C. at rates greater than 10° C./s even with geometric constrictions resulting in cross-sectional areas as small as 0.05 mm$^2$. This is critical for enabling fast heat transfer in magnetofluidic heat blocks that require a cantilevered geometry to allow for offset of thermoelectric heatsinking for magnetic access to both top and bottom of the cartridge. Furthermore, aspect ratios of the well showed minor effect in the temperature ramp rate with a maximum CV of 6.5% for aspect ratios ranging from 0.5 to 4. This permits flexibility in well geometry for ease in ensuring compatibility with thermoforming and CNC milling manufacture of cartridges and heat blocks without sacrificing thermal performance.

The final heat block design minimized thermal mass by conforming exactly to the dimensions of the thermoelectric element apart from the cantilevered well to allow magnetic accessibility. A minimum thickness of 0.25 mm was chosen due to practical machining limitations and to provide sufficient mechanical strength to withstand 5 lbs of force (~22.2 N) applied to the end of the well without yielding given a 10-fold safety margin. Over the full range of thermal cycling temperatures between 60° C. to 100° C., heating rates range from 10.4 to 4.2° C./sec and cooling rates from 10.0 to 18.5° C./sec (FIG. 14C).

Example 3

Figure 15:
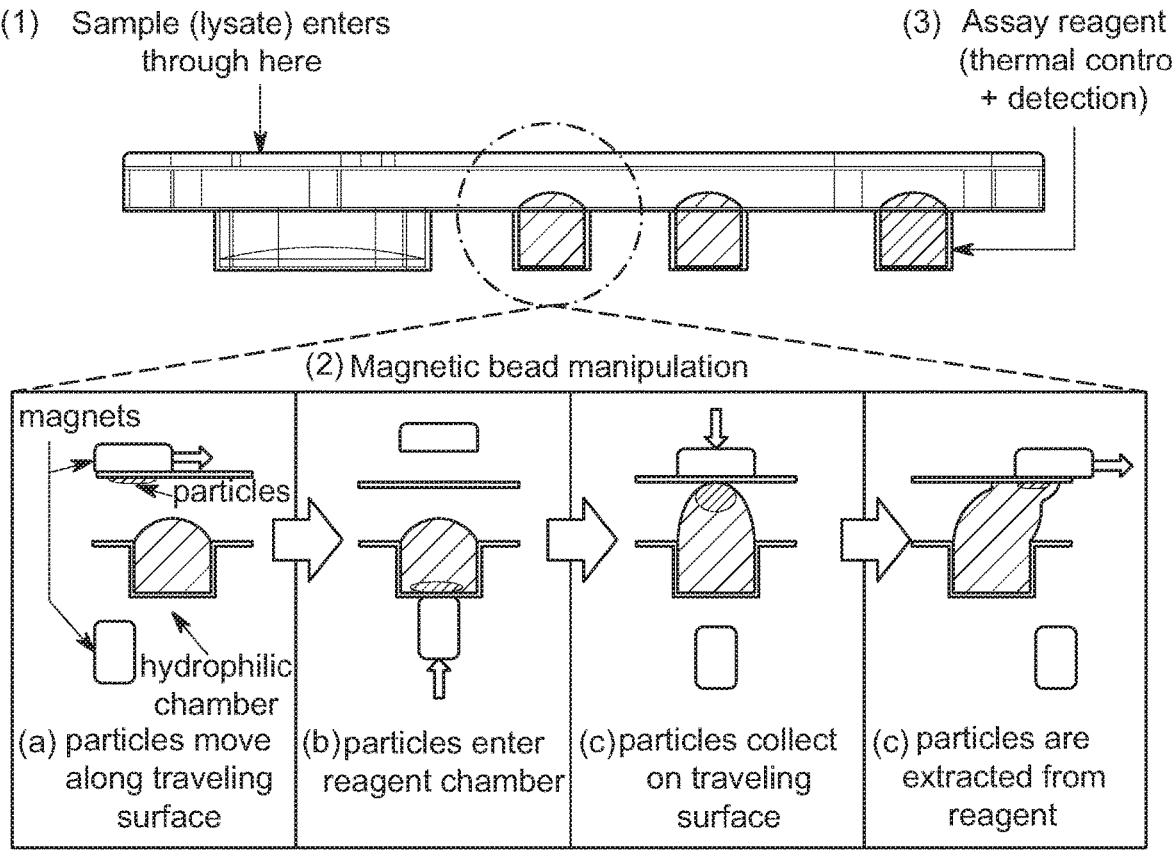
FIG. 15 is an illustration showing use of a magnetofluidic device according to an embodiment of the invention.

FIG. 15 is an illustration showing a method of using a magnetofluidic device for the detection of a nucleic acid in a sample according to an embodiment of the invention. In FIG. 15, the method includes loading the sample into a sample well of a magnetofluidic cartridge. The magnetofluidic cartridge includes: a top layer; a bottom layer spaced apart from the top layer in a generally parallel orientation with respect to the top layer, the bottom layer defining a plurality of wells therein that protrude from a surface of the bottom layer, the plurality of wells including the sample well and a detection well; and a spacer layer between and in contact with the top and bottom layers at least along a periphery thereof to seal contents within the magnetofluidic cartridge. The method also includes contacting the nucleic acid sequence with a magnetic particle such that the nucleic acid sequence binds to the magnetic particle (indicated by step (1) of FIG. 15). The method also includes manipulating the magnetic particle bound to the nucleic acid out of the sample well and into adjacent wells, as indicated in steps 2a-2d of FIG. 15. This manipulation includes moving the magnetic particle bound to the nucleic acid along a first degree of freedom so as to be able to draw the magnetic particle bound to the nucleic acid out of the sample well and into the spacer layer. Then, manipulating the magnetic particle bound to the nucleic acid along a second degree of freedom so as to be able translocate the magnetic particle bound to the nucleic acid within the spacer layer and to a position above an adjacent well. Ultimately, the magnetic particle bound to the nucleic acid is positioned over the detection well, and manipulated along the first degree of freedom so as to be able to draw the magnetic particle bound to the nucleic acid out of spacer layer and into the detection well. Next, the nucleic acid sequence is amplified in the detection well, as indicated in step (3) of FIG. 15. Finally, the nucleic acid sequence is detected.

Example 4

Figures 16A, 16B, 16C, 16D:
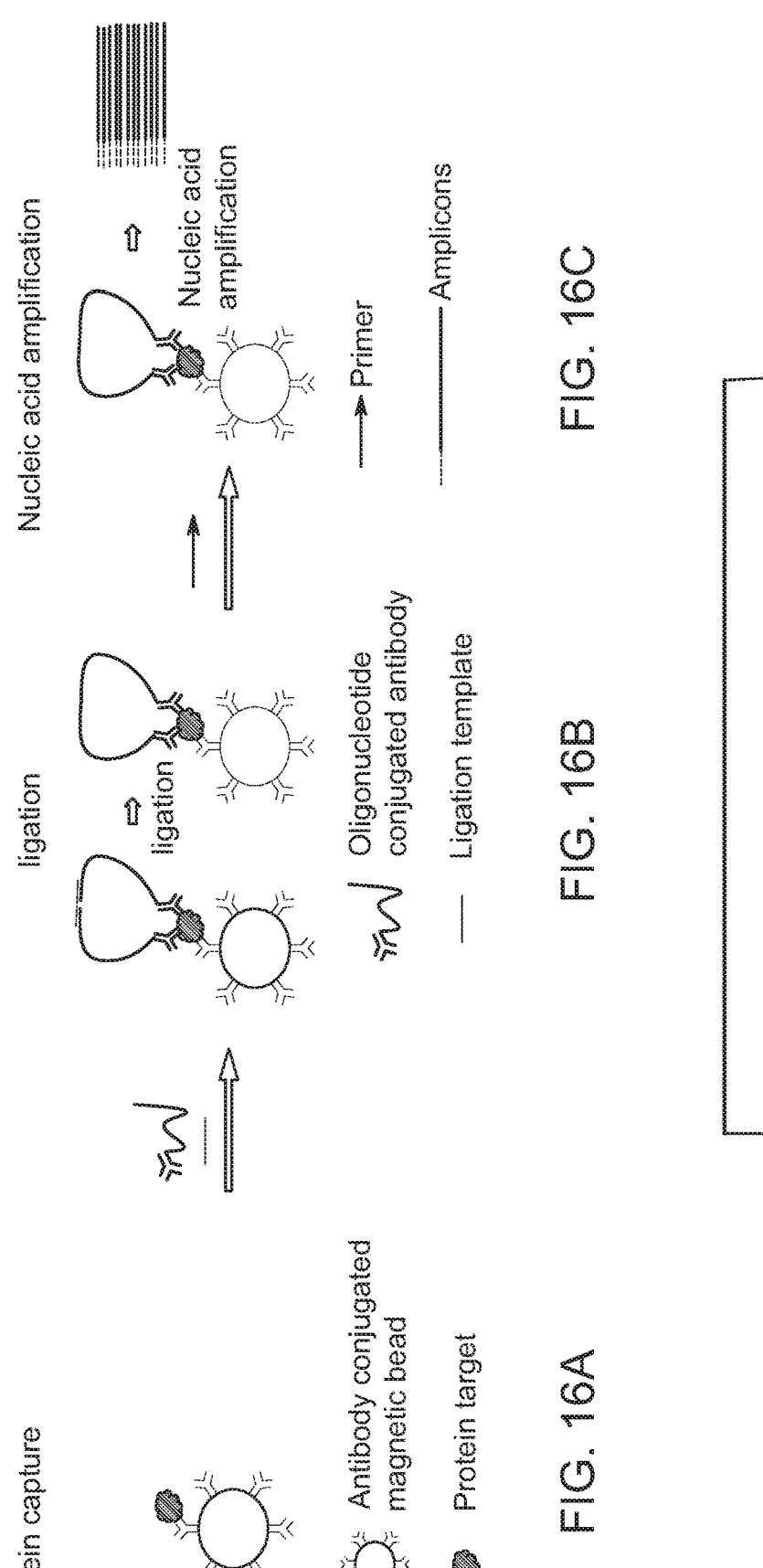
FIGS. 16A-16D are a series of illustrations demonstrating a method of using a magnetofluidic device for the detection of a target protein according to an embodiment of the invention.

FIGS. 16A-16D are a series of illustrations demonstrating a method of using a magnetofluidic device for the detection of a target protein according to an embodiment of the invention. In FIG. 16A, antibody-conjugated magnetic beads are used to capture a target protein from a biological sample. As shown in FIG. 16B, oligonucleotide-conjugated antibodies and a ligation template are added for a ligation reaction to occur when the oligonucleotide-conjugated antibodies bind to the target protein. Importantly, successful ligation of the oligonucleotide occurs only in the presence of the target protein. Thus, if the biological sample does not have target protein, ligation of the oligonucleotide will not occur. As shown in FIG. 16C, primers are added for nucleic acid amplification using the ligated oligonucleotide as a template. The generation of amplicons is used as an indication for positive detection of the target protein. FIG. 16D is an example of a magnetofluidic cartridge design comprising four wells for carrying out the steps of protein capture discussed above: ligation reaction, wash, and nucleic acid amplification/detection.

REFERENCES

1. Edlin, B. R., Eckhardt, B. J., Shu, M. A., Holmberg, S. D. & Swan, T. Toward a more accurate estimate of the prevalence of hepatitis C in the United States. *Hepatology* 62, 1353-1363 (2015).
2. TOM (Institute of Medicine). *Hepatitis and Liver Cancer: A National Strategy for Prevention and Control of Hepatitis B and C.* (The National Academies Press, 2010). doi:10.17226/12793
3. Hagan, H. et al. Self-reported hepatitis C virus antibody status and risk behavior in young injectors. Public Health Rep. 121, 710-719 (2006).
4. Rein, D. B. et al. The cost-effectiveness of birth-cohort screening for hepatitis C antibody in U.S. primary care settings. *Ann. Intern. Med.* 156, 263-270 (2012).
5. Linas, B. P. et al. The hepatitis C cascade of care: Identifying priorities to improve clinical outcomes. *PLoS One* 9, (2014).
6. Johannessen, A. Where we are with point-of-care testing. *Journal of Viral Hepatitis* 22, 362-365 (2015).
7. Unger, M. A., Chou, H. P., Thorsen, T., Scherer, A. & Quake, S. R. Monolithic microfabricated valves and pumps by multilayer soft lithography. *Science* (80-.). 288, 113-116 (2000).
8. Jiang, X., Ng, J. M. K., Stroock, A. D., Dertinger, S. K. W. & Whitesides, G. M. A miniaturized, parallel, serially diluted immunoassay for analyzing multiple antigens. *J. Am. Chem. Soc.* 125, 5294-5295 (2003).
9. Zhang, Y. et al. A surface topography assisted droplet manipulation platform for biomarker detection and pathogen identification. *Lab Chip* 11, 398-406 (2011).
10. Shin, D. J. & Wang, T. H. Magnetic Droplet Manipulation Platforms for Nucleic Acid Detection at the Point of Care. Ann. Biomed. Eng. 42, 2289-2302 (2014).
11. Zhang, Y. & Nguyen, N.-T. Magnetic digital microfluidics—a review. *Lab Chip* 17, 994-1008 (2017).
12. Berry, S. M., Alarid, E. T. & Beebe, D. J. One-step purification of nucleic acid for gene expression analysis via Immiscible Filtration Assisted by Surface Tension (IFAST). *Lab Chip* 11, 1747 (2011).
13. Chiou, C. H., Jin Shin, D., Zhang, Y. & Wang, T. H. Topography-assisted electromagnetic platform for blood-to-PCR in a droplet. *Biosens. Bioelectron.* 50, 91-99 (2013).
14. Lehmann, U., Vandevyver, C., Parashar, V. K. & Gijs, M. A. M. Droplet-based DNA purification in a magnetic lab-on-a-chip. *Angew. Chemie-Int. Ed.* 45, 3062-3067 (2006).
15. Zhang, Y. & Wang, T. H. Full-range magnetic manipulation of droplets via surface energy traps enables complex bioassays. Adv. Mater. 25, 2903-2908 (2013).
16. Pipper, J. et al. Catching bird flu in a droplet. Nat. Med. 13, 1259-1263 (2007).
17. Shin, D. J. et al. Mobile nucleic acid amplification testing (mobiNAAT) for *Chlamydia trachomatis* screening in hospital emergency department settings. Sci. Rep. 7, 4495 (2017).
18. Scott, J. D. & Gretch, D. R. Molecular Diagnostics of Hepatitis C Virus Infection. *JAMA* 297, 724 (2007).

19. Pawlotsky, J.-M. et al. Standardization of Hepatitis C Virus RNA Quantification. *Hepatology* 32, 654-659 (2000).

20. Gourlain, K. et al. Dynamic Range of Hepatitis C Virus RNA Quantification with the Cobas Ampliprep-Cobas Amplicor HCV Monitor v2.0 Assay. *J. Clin. Microbiol.* 43, 1669-1673 (2005).

21. Al-Soud, W. A. & Rådström, P. Purification and characterization of PCR-inhibitory components in blood cells. *J. Clin. Microbiol.* 39, 485-93 (2001).

22. Kodzius, R. et al. Inhibitory effect of common microfluidic materials on PCR outcome. *Sensors Actuators B Chem.* 161, 349-358 (2012).

23. Tone, K., Fujisaki, R., Yamazaki, T. & Makimura, K. Enhancing melting curve analysis for the discrimination of loop-mediated isothermal amplification products from four pathogenic molds: Use of inorganic pyrophosphatase and its effect in reducing the variance in melting temperature values. *J. Microbiol. Methods* 132, 41-45 (2017).

24. Ghany, M. G., Strader, D. B., Thomas, D. L. & Seeff, L. B. Diagnosis, management, and treatment of hepatitis C: An update. *Hepatology* 49, 1335-1374 (2009).

25. Galbraith, J. W. et al. Unrecognized chronic hepatitis C virus infection among baby boomers in the emergency department. *Hepatology* 61, 776-782 (2015).

26. Falade-Nwulia, O. et al. Public health clinic-based hepatitis C testing and linkage to care in baltimore. *J. Viral Hepat.* 23, 366-374 (2016).

27. National Institutes of Health Consensus Development Conference Statement: Management of hepatitis C 2002 (Jun. 10-12, 2002). *Gastroenterology* 123, 2082-2099 (2002).

28. Ticehurst, J. R., Hamzeh, F. M. & Thomas, D. L. Factors Affecting Serum Concentrations of Hepatitis C Virus (HCV) RNA in HCV Genotype 1-Infected Patients with Chronic Hepatitis. *J. Clin. Microbiol.* 45, 2426-2433 (2007).

29. Zein, N. N. Clinical significance of hepatitis C virus genotypes. *Clin. Microbiol. Rev.* 13, 223-35 (2000).

30. Daw, M. A., Elasifer, H. A., Dau, A. A. & Agnan, M. The role of hepatitis C virus genotyping in evaluating the efficacy of INF-based therapy used in treating hepatitis C infected patients in Libya. *Virol. Discov.* 1, 3 (2013).

31. Liu, C. et al. A high-efficiency superhydrophobic plasma separator. *Lab Chip* 16, 553-560 (2016).

32. Bhamla, M. S. et al. Hand-powered ultralow-cost paper centrifuge. *Nat. Biomed. Eng.* 1, 9 (2017).

33. Estes, M. D. et al. Optimization of multiplexed PCR on an integrated microfluidic forensic platform for rapid DNA analysis. *Analyst* 137, 5510-9 (2012).

34. Kim, J., Byun, D., Mauk, M. G. & Bau, H. H. A disposable, self-contained PCR chip. *Lab Chip* 9, 606-612 (2009).

35. Song, J. et al. A Multifunctional Reactor with Dry-Stored Reagents for Enzymatic Amplification of Nucleic Acids. *Anal. Chem.* 90, 1209-1216 (2018).

36. Stark, A., Shin, D. J., Pisanic, T., Hsieh, K. & Wang, T. H. A parallelized microfluidic DNA bisulfite conversion module for streamlined methylation analysis. *Biomed. Microdevices* 18, 1-7 (2016).

37. Gachon, C., Mingam, A. & Charrier, B. Real-time PCR: what relevance to plant studies? *J. Exp. Bot.* 55, 1445-1454 (2004).

38. Hamond, C. et al. Urinary PCR as an increasingly useful tool for an accurate diagnosis of leptospirosis in livestock. *Vet. Res. Commun.* 38, 81-85 (2014).

39. Mirmajlessi, S. M., Destefanis, M., Gottsberger, R. A., Mand, M. & Loit, E. PCR-based specific techniques used for detecting the most important pathogens on strawberry: a systematic review. *Syst. Rev.* 4, 9 (2015).

40. Tichopad, A. Standardized determination of real-time PCR efficiency from a single reaction set-up. *Nucleic Acids Res.* 31, 122e-122 (2003).

41. Pisanic, T. R. et al. DREAMing: A simple and ultrasensitive method for assessing intratumor epigenetic heterogeneity directly from liquid biopsies. *Nucleic Acids Res.* 43, 1-15 (2015).

The embodiments illustrated and discussed in this specification are intended only to teach those skilled in the art how to make and use the invention. In describing embodiments of the invention, specific terminology is employed for the sake of clarity. However, the invention is not intended to be limited to the specific terminology so selected. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

---

We claim:

1. A magnetofluidic device for assaying a biomolecule from a sample, comprising:

a magnetofluidic cartridge having a plurality of wells configured for said assaying, at least one well of the plurality of wells comprising a plurality of magnetic particles;

a cartridge assembly securing the magnetofluidic cartridge;

a magnetic particle manipulation assembly arranged proximate said cartridge assembly, said magnetic particle manipulation assembly comprising: a first magnet arranged at a first side of the magnetofluidic cartridge and a second magnet arranged at a second side opposite the first side of the magnetofluidic cartridge such that the first magnet and the second magnet are on opposing sides of said magnetofluidic cartridge, the first magnet and the second magnet are substantially aligned along a line that is transverse to said magnetofluidic cartridge such that said line is alignable with a first well of the plurality of wells in said magnetofluidic cartridge, and a dual-axis actuator configured to drive the first magnet and the second magnet; and a temperature control assembly arranged proximate said cartridge assembly, said temperature control assembly comprising a heat exchange portion structured and arranged to be in thermal connection with a second well of the plurality of wells, wherein at least one of the first magnet and the second magnet is movable, by the dual-axis actuator, in a first degree of freedom along said line relative to said magnetofluidic cartridge such that the plurality of magnetic particles when contained within said first well will be drawn out of said first well during operation along the first degree of freedom, and wherein the first magnet and the second magnet are movable, by the dual-axis actuator, along a second degree of freedom parallel to a surface of the magnetofluidic cartridge to translate said plurality of magnetic particles along said surface of the magnetofluidic cartridge such that said line is alignable with said second well, and wherein at least one of the first magnet and the second magnet are movable, by the dual-axis actuator, in said first degree of freedom along said line relative to said magnetofluidic cartridge such that the plurality of magnetic particles will be drawn into said second well in said magnetofluidic cartridge.

2. The magnetofluidic device of claim 1, wherein said heat exchange portion is a heat block that has a shape that is at least partially complementary to a shape of said at least one well to provide an enhanced surface for heat exchange therethrough, and wherein said temperature control assembly further comprises:

a heater in thermal contact with said heat block;

a temperature sensor in thermal contact with said heat block;

a cooling system in thermal contact with said heat block; and a temperature control device configured to receive temperature signals from said temperature sensor and to provide control signals to said heater and said cooling system.

3. The magnetofluidic device of claim 1, wherein said magnetic particle manipulation assembly further comprises:

a first actuator assembly operatively connected to said first magnet and said second magnet such that said first magnet and said second magnet are movable along said line in the first degree of freedom, and a second actuator assembly operatively connected to said first magnet and said second magnet such that said first magnet and said second magnet are movable from the first location of said first well to the second location of said second well in the second degree of freedom, and wherein the first magnet and the second magnet are permanent magnets.

4. The magnetofluidic device of claim 3, wherein said second actuator assembly is a rotational assembly, said second degree of freedom being a rotational degree of freedom.

5. The magnetofluidic device of claim 1, further comprising a detection system arranged proximate said cartridge assembly so as to be able to detect a physical parameter for a test concerning the biomolecule.

6. The magnetofluidic device of claim 1, wherein the magnetofluidic cartridge comprises a top first layer, a second layer spaced apart from the first layer, the second layer defining the plurality of wells therein, and a spacer layer disposed between and in contact with the first layer and at least a periphery of the second layer to seal the magnetic particles within the magnetofluidic cartridge.

7. The magnetofluidic device of claim 1, wherein said magnetofluidic device is a portable device.

8. The magnetofluidic device of claim 1, wherein said magnetofluidic device is a handheld device.

9. The magnetofluidic device of claim 1, the magnetofluidic cartridge for assaying a nucleic acid sequence from a sample, comprising:

a first layer; and a second layer spaced apart from said first layer in a generally parallel orientation with respect to said first layer, said second layer defining a plurality of wells therein that protrude from a surface of said second layer, wherein at least one of said plurality of wells comprises a wall sufficiently thin to allow a heat transfer rate such that a nucleic acid amplification assay will be completed in under 20 minutes.

10. The magnetofluidic device of claim 9, wherein one of said plurality of wells comprises a wall of between 0.05 mm-0.5 mm in thickness.

11. The magnetofluidic device of claim 9, wherein the magnetofluidic cartridge comprises a spacer layer between and in contact with said first layer and said second layer at least along a periphery thereof to seal contents within the at least one well of the plurality of wells said magnetofluidic cartridge.

12. The magnetofluidic device of claim 9, wherein the magnetofluidic cartridge comprises the plurality of magnetic particles preloaded into the at least one of said plurality of wells, wherein said at least one of said plurality of wells is a sample well having a port for disposing a sample therein during use, and wherein said plurality of magnetic particles are coated magnetic nanoparticles so as to adhere electrostatically to nucleic acids.

13. The magnetofluidic device of claim 12, wherein the magnetofluidic cartridge comprises:

a plurality of processing fluids each preloaded in a respective one of said plurality of wells; and a sealing fluid preloaded into said magnetofluidic cartridge between said first and second layers, wherein said sealing fluid is immiscible with said plurality of processing fluids so as to provide containment of each of said plurality of processing fluids in a respective one of said plurality of wells, and wherein said sealing fluid is hydrophobic.

14. The magnetofluidic device of claim 13, wherein each of said plurality of processing fluids preloaded into said magnetofluidic cartridge are selected in number and type according to a test to be performed.

15. The magnetofluidic device of claim 14, wherein at least one of said plurality of processing fluids comprises a reagent for a nucleic acid amplification assay.

16. The magnetofluidic device of claim 15, wherein said magnetofluidic cartridge is self-contained and remains sealed other than to receive a sample during an entirety of said nucleic acid amplification assay.

17. A method of detecting a biomolecule in a sample using a magnetofluidic device for assaying a biomolecule from a sample, comprising: a magnetofluidic cartridge having a plurality of wells configured for said assaying, at least one well of the plurality of wells comprising a plurality of magnetic particles; a cartridge assembly structured to accept and secure the magnetofluidic cartridge; and a magnetic particle manipulation assembly arranged proximate said cartridge assembly, said magnetic particle manipulation assembly comprising a first magnet arranged at a first side the magnetofluidic cartridge and a second magnet arranged at a second side opposite the first side of the magnetofluidic cartridge such that the first magnet and the second magnet are on opposing sides of said magnetofluidic cartridge, the first magnet and the second magnet are substantially aligned along a line that is transverse to said magnetofluidic cartridge such that said line is aligned with a first well of the plurality of wells in said magnetofluidic cartridge, and a dual-axis actuator configured to drive the first magnet and the second magnet; and a temperature control assembly arranged proximate said cartridge assembly, said temperature control assembly comprising a heat exchange portion structured and arranged to be in thermal connection with the at least one well of the plurality of wells, the method comprising:

loading said sample into a sample well of a magnetofluidic cartridge so as to contact said biomolecule with a magnetic particle such that the biomolecule binds to the magnetic particle;

moving, by the dual-axis actuator, the first magnet in a first degree of freedom along said line relative to said magnetofluidic cartridge so as to move the magnetic particle bound to the biomolecule along the first degree of freedom to draw the magnetic particle bound to the biomolecule out of the sample well and into a spacer layer of said magnetofluidic cartridge;

moving, by the dual-axis actuator, the first magnet along a second degree of freedom to translate the magnetic particle bound to the biomolecule along the second degree of freedom to translate the magnetic particle bound to the biomolecule within the spacer layer to a position at a detection well of said magnetofluidic cartridge;

drawing, using the second magnet, the magnetic particle bound to the biomolecule along the first degree of freedom out of the spacer layer and into the detection well;

heating the biomolecule such that amplification of the biomolecule occurs; and detecting the biomolecule.

18. The method of claim 17, wherein said moving the magnetic particle bound to the biomolecule along the first degree of freedom and said translating the magnetic particle bound to the biomolecule along the second degree of freedom comprises moving, using the dual-axis actuator, the first magnet and the second magnet.

19. The method of claim 17, wherein said amplification of said biomolecule comprises using a temperature control assembly arranged proximate said cartridge assembly and being structured to receive said detection well in a heat exchange portion of said temperature control assembly.

20. The method of claim 17, wherein said heating the biomolecule comprises heating the biomolecule such that amplification of the biomolecule occurs in under 20 minutes.

21. The magnetofluidic cartridge of claim 1, wherein the first magnet and the second magnet are independently operable.

22. The magnetofluidic cartridge of claim 1, wherein the heat exchange portion comprises a heat block minimally attenuating a magnetic field generated by the first magnet or the second magnet.

23. The magnetofluidic cartridge of claim 1, wherein the first magnet is operable to attract the magnetic particles from the first well towards an internal side surface of the magnetofluidic cartridge and to move the magnetic particles along the internal side surface towards the second well, and the second magnet is operable to attract the magnetic particles into the second well.

24. The magnetofluidic cartridge of claim 23, wherein the first magnet is movable, by the dual-axis actuator, towards the magnetofluidic cartridge to attract the magnetic particles from the first well towards the internal side surface of the magnetofluidic cartridge and to translate the magnetic particles along the internal side surface towards the second well, wherein the second magnet is movable towards the magnetofluidic cartridge to attract the magnetic particles into the second well.

* * * * *

SEQUENCE LISTING

```
<160> NUMBER OF SEQ ID NOS: 5

<210> SEQ ID NO 1
<211> LENGTH: 22
<212> TYPE: DNA
<213> ORGANISM: Artificial Sequence
<220> FEATURE:
<223> OTHER INFORMATION: Primer

<400> SEQUENCE: 1
cgtttttggc gttgtttatt tt                                             22

<210> SEQ ID NO 2
<211> LENGTH: 29
<212> TYPE: DNA
<213> ORGANISM: Artificial Sequence
<220> FEATURE:
<223> OTHER INFORMATION: Primer
```

-continued

```
<400> SEQUENCE: 2
acataatacg caaattctta ataaccctc                                    29

<210> SEQ ID NO 3
<211> LENGTH: 119
<212> TYPE: DNA
<213> ORGANISM: Artificial Sequence
<220> FEATURE:
<223> OTHER INFORMATION: Primer

<400> SEQUENCE: 3
cgtttttggc gttgtttatt ttttcgtgag tcgcgggatg tgaattacga aaatttttat      60
tcgcggcggg tcgtacgcgc gtcgaattcg gagggttatt aagaatttgc gtattatgt      119

<210> SEQ ID NO 4
<211> LENGTH: 25
<212> TYPE: DNA
<213> ORGANISM: Artificial Sequence
<220> FEATURE:
<223> OTHER INFORMATION: Primer

<400> SEQUENCE: 4
ggagagccat agtggtctgc ggaac                                        25

<210> SEQ ID NO 5
<211> LENGTH: 25
<212> TYPE: DNA
<213> ORGANISM: Artificial Sequence
<220> FEATURE:
<223> OTHER INFORMATION: Primer

<400> SEQUENCE: 5
ctcgcaagca ccctatcagg cagta                                        25
```